(12) United States Patent
Wright

(10) Patent No.: US 7,174,811 B2
(45) Date of Patent: Feb. 13, 2007

(54) ASYMMETRIC WRENCH AND FASTENER SYSTEM

(75) Inventor: Richard B. Wright, Akron, OH (US)

(73) Assignee: Wright Tool Company, Barberton, OH (US)

( * ) Notice: Subject to any disclaimer, the term of this patent is extended or adjusted under 35 U.S.C. 154(b) by 0 days.

(21) Appl. No.: 11/148,722

(22) Filed: Jun. 9, 2005

(65) Prior Publication Data

US 2005/0223854 A1   Oct. 13, 2005

Related U.S. Application Data

(63) Continuation of application No. 10/458,022, filed on Jun. 10, 2003, now Pat. No. 6,904,833, and a continuation-in-part of application No. 09/282,865, filed on Mar. 31, 1999, now Pat. No. 6,698,316, and a continuation-in-part of application No. 09/240,313, filed on Jan. 29, 1999, now Pat. No. 6,725,746, which is a continuation-in-part of application No. 09/059,712, filed on Apr. 13, 1998, now Pat. No. 6,698,315.

(60) Provisional application No. 60/388,081, filed on Jun. 12, 2002.

(51) Int. Cl.
  *B25B 13/06* (2006.01)
  *B16B 23/00* (2006.01)

(52) U.S. Cl. ............... 81/121.1; 81/436; 411/403

(58) Field of Classification Search ........... 81/121.1, 81/436, 441, 119, 124.2, 124.3, 460, 461; 411/402–405, 407, 410, 1–5
See application file for complete search history.

(56) References Cited

U.S. PATENT DOCUMENTS

| 996,841 | A | 7/1911 | Dixon |
| 1,798,944 | A | 3/1931 | Hackman |
| 2,400,205 | A | 5/1946 | Livermont |
| 2,685,812 | A | 8/1954 | Dmitroff |
| 2,813,450 | A | 11/1957 | Dzus |
| 3,354,757 | A | 11/1967 | Grimm et al. |
| 3,425,314 | A | 2/1969 | Ohlson |

(Continued)

FOREIGN PATENT DOCUMENTS

DE    306 294    6/1918

(Continued)

OTHER PUBLICATIONS

PCT Written Opinion for PCT/US99/08019 claiming priority of U.S. Appl. No. 09/059,712, pp. 1-6.

(Continued)

*Primary Examiner*—D. S. Meislin
(74) *Attorney, Agent, or Firm*—D. Peter Hochberg; Sean Mellino

(57) ABSTRACT

An asymmetrical wrench and fastener system comprising radially extending splines having opposing surfaces whose inner ends are inclined by different amounts with respect to a radius intersecting the respective inner ends to alter the torque between the tightening and loosening directions. This configuration makes it either easier or harder to loosen the fastener than it was to tighten it, depending on the amount the opposing surfaces of the splines are inclined.

5 Claims, 18 Drawing Sheets

U.S. PATENT DOCUMENTS

| | | |
|---|---|---|
| 3,656,396 A | 4/1972 | Gutshall |
| 3,802,303 A | 4/1974 | Evans et al. |
| 3,834,269 A | 9/1974 | Ohringer |
| 3,854,372 A | 12/1974 | Gutshall |
| 3,881,377 A | 5/1975 | Evans et al. |
| 3,885,480 A | 5/1975 | Muenchinger |
| 3,903,764 A | 9/1975 | Andersen |
| 3,908,488 A | 9/1975 | Andersen |
| 4,073,160 A | 2/1978 | Perret |
| 4,084,478 A | 4/1978 | Simmons |
| 4,151,621 A | 5/1979 | Simmons |
| 4,176,582 A | 12/1979 | Witte |
| 4,187,892 A | 2/1980 | Simmons |
| 4,352,614 A | 10/1982 | Hirsch |
| 4,361,412 A | 11/1982 | Stolarczyk |
| 4,742,735 A | 5/1988 | Stencel |
| 4,882,957 A | 11/1989 | Wright et al. |
| 5,012,706 A | 5/1991 | Wright et al. |
| 5,174,704 A | 12/1992 | Kazino et al. |
| 5,228,250 A | 7/1993 | Kesselman |
| 5,291,811 A | 3/1994 | Goss |
| 5,449,260 A | 9/1995 | Whittle |
| 5,461,952 A | 10/1995 | Goss |
| 5,481,948 A | 1/1996 | Zerkovitz |
| D372,409 S | 8/1996 | Wright |
| 5,542,273 A | 8/1996 | Bednarz |
| 5,551,322 A | 9/1996 | Mikic et al. |
| 5,713,705 A | 2/1998 | Grünbichler |
| 5,921,735 A | 7/1999 | Hughes |
| 5,957,645 A | 9/1999 | Stacy |

FOREIGN PATENT DOCUMENTS

| | | |
|---|---|---|
| DE | 40 22 763 A1 | 1/1991 |
| DE | 19 610 748 | 1/1997 |
| FR | 2 234 095 | 1/1975 |
| GB | 1 204 294 | 9/1970 |
| GB | 2 060 452 | 5/1981 |
| GB | 2140523 | 11/1984 |
| WO | WO 88/09708 | 12/1988 |
| WO | WO 99/18361 | 4/1999 |
| WO | WO 00/13857 | 3/2000 |

OTHER PUBLICATIONS

Phillips Screw Company, *Aerospace, Innovation in Fastener Technology*, 8 pp.

Phillips Screw Company, Specification Sheets, 16 pp., 1992.

John Forbis, "Double-stage fracturable fastener for bondable elements," *Navy Technical Disclosure Bulletin*, vol. 10, No. 3, Mar. 1985, pp. 45-51.

"Screws have automatic torque control," *Machine Design*, vol. 54, No. 23, Oct. 1982, p. 112.

ASYMMETRIC WRENCH AND FASTENER SYSTEM

CROSS REFERENCE TO RELATED APPLICATION

This application is a continuation of U.S. Ser. No. 10/458,022 filed Jun. 10, 2003, which issued as U.S. Pat. 6,904,833 on Jun. 14, 2005 and which claims the benefit of U.S. provisional patent application Ser. No. 60/388,081, filed Jun. 12, 2002; and is a continuation-in-part of Ser. No. 09/282,865 filed Mar. 31, 1999, which issued as U.S. Pat. 6,698,316 on Mar. 2, 2004 and which is a continuation-in-part of Ser. No. 09/059,712 filed Apr. 13, 1998 which issued as U.S. Pat. 6,698,315 on Mar. 2, 2004; and is a continuation-in-part of Ser. No. 09/240,313 filed Jan. 29, 1999, which issued as U.S. Pat. 6,725,746 on Apr. 27, 2004 and is also a continuation-in-part of Ser. No. 09/059,712 filed Apr. 13, 1998.

BACKGROUND OF THE INVENTION

1. Field of the Invention

The invention relates generally to an asymmetrical wrench and fastener arrangement having a higher torque in the loosening direction than in the tightening direction, or in the tightening direction than in the loosening direction, for a given amount of applied force. The invention also relates to a wrench and fastener arrangement, wherein there is a higher torque to failure in the tightening direction than in the loosening direction. The invention further relates to an asymmetrical fastener which has a higher torque to failure in one direction than the other, which is stronger than corresponding symmetrical fasteners. Additionally, the invention relates to an asymmetrical spline wrench which can be used with a variety of fasteners.

2. Description of the Prior Art

Fasteners come in a variety of types. For example, there are nuts, which are threaded onto a metal shaft, and bolts, which may threadingly receive a nut or be threadingly received in a bore. Fasteners usually have a head that includes surfaces for loosening and surfaces for tightening. On many fasteners, the loosening surfaces are the same as the tightening surfaces (for example, a hex head nut or bolt). These can be referred to as symmetrical fasteners. Other fasteners utilize surfaces for loosening that are different than the surfaces utilized for tightening. The loosening surfaces and tightening surfaces may be formed on the outer perimeter of the fastener head (hereinafter sometimes referred to as an "external head" or "body") or on a periphery formed inside of the outer perimeter (hereinafter sometimes referred to as a fastener having an "internal wrench cavity"). The latter fasteners can also be referred to as symmetrical fasteners. External fasteners are designed for use with open-end wrenches or closed end wrenches (or closed wrenches), such as box wrenches or socket end wrenches. Internal fasteners or "closed fasteners" (among which are so called "Allen" fasteners), often referred to as socket head cap screws, are generally designed for use with an internal-key wrench or internal bit. Some wrenches (such as an open-end adjustable wrench) are designed to fit a variety of fastener sizes and configurations.

The periphery on which the loosening surfaces and tightening surfaces of a fastener are formed is sometimes referred to herein as a fastening periphery. While many fasteners have the loosening surfaces and tightening surfaces formed on the same fastening periphery, it is also known to form loosening surfaces on one fastening periphery and tightening surfaces on a different fastening periphery. Such a design has the disadvantages of (1) being relatively expensive, and (2) having a large fastener head which may be too large for practical use in certain applications.

Known wrenches and fasteners have primarily been designed symmetrically, transmitting torque equally in both the tightening and loosening directions. Typical socket wrench types of this kind are shown in FIGS. 1–3, all of which are closed wrenches. FIG. 1 shows a 1½" hex socket, FIG. 2 shows a 1" 12-point or double-hex socket, and FIG. 3 shows a 1" 12-point spline. However, the torque required for loosening a fastener that has been tightened is often several times more than the torque required for tightening a fastener. This is because metal surfaces in contact with one another for an extended period of time tend to seize and resist separation. Another factor that causes the fastener to resist separation is the dissolution of the lubricant that may have been present at the time of tightening. Additionally, tightening of a fastener to near its ultimate strength will cause permanent deformation. This permanent deformation causes the pitch of the threads on the fastener to no longer precisely match the pitch of the nut or the tapped hole. The mismatch requires additional torque to force the threaded elements to conform sufficiently to allow rotation of the fastener. The application of the additional torque required to loosen a fastener can result in system failure (sometimes referred to herein simply as "failure") prior to the fastener being loosened.

There are numerous modes of fastening system failure. When failure occurs, the mode of failure depends on both the design and physical properties of the wrench and fastener, including their respective strengths, hardnesses and ductilities. A socket wrench may split because of the combined circumferential and radial forces, or its teeth (sometimes referred to herein as protuberances) may shear or bend because of the combination of radial and circumferential forces. The teeth may flow from excessive contact pressure. Further, the points (sometimes referred to herein as corners or protuberances) of the fastener may shear, bend or flow. In addition, in the case of a hollow-head fastener or socket head cap fastener, the fastener head may split due to a combination of radial and circumferential forces, or the wrench may fail in torsion. Existing fasteners and wrenches tend to have a single mode of failure for each particular wrench and fastener. There are numerous modes of failure for both wrenches and fasteners that must be considered so that if steps are taken to strengthen against one failure mode it does not result in increasing the likelihood of another failure mode.

There are various causes of failure in known fastening systems. Many of these problems, such as with double-hex wrenches and double-hex fasteners, are due to points or corners. Corner loading, which results from the engagement of corners on the wrench with the fastener and with corners on the fastener with the wrench, results in wearing down or shearing of the corners and in damage to the surface engaged by the corner. Clearance between the fastener and the wrench results in concentrated force stresses on the fastener and the wrench, and there is a reduced torque resulting from applied force. This load concentration even occurs at normal clearance. Since the fastener is usually at a lower hardness that the wrench, it deforms—and this is aggravated because of the expansion of the wrench under radial loads. The problem is increased with a worn wrench.

Corrosion and paint on fasteners requires increased torque, and concentrated forces can damage the fastener and the wrench. The points on a wrench can be damaged by poor engagement with a fastener. If the fastener is small for the wrench or if the fastener is badly corroded, the wrench may not turn the fastener.

Spline systems have been found to be advantageous in that they can withstand significant amounts of torque. However, a shortcoming of traditional spline fasteners and spline wrenches is that the dimension across the base of the spline is not significantly larger than the dimension near the top of the spline, making the spline susceptible to shear failure.

Failures in traditional wrench and fastener systems have been analyzed, and it has been found that there is significant failure particularly on fastener teeth. This is shown in FIG. 13 and discussed below.

Traditional wrench and fastener systems, such as double-hex systems discussed above, have point-to-point engagement between the point of the wrench and the point of the fastener. This puts force on the points and leads to wearing down of the points of one or both of the fastener and the wrench, limiting their durability and use fitness.

Fastening system failure is expensive because of increased labor and the cost of providing new wrenches and/or fasteners. For example, if a bolt fails the damaged bolt must usually be drilled and removed with special tools. Fastening system failure can also be dangerous because a user applying a great deal of force to a fastener can be harmed when the system fails and his hand or arm may strike a hard or sharp object. Fastener system failure most often occurs when attempting to loosen a fastener because of the greater torque required.

Another problem with traditional wrench and fastener systems, and particularly with spline systems, is that many of these are made with forging techniques. There is considerable difficulty in metal flow in forming the teeth, since the metal must flow into a die, and the flow along surfaces is impeded due to friction between the die surface and the flowing metal. This is particularly acute with spline teeth, since the metal must flow into corners near the base of the fastener or the wrench.

There are many different types of fasteners, wrenches, and systems, many of which are designed specifically for unique applications. For example, there are some systems designed for limiting torque applied in tightening a fastener, some systems designed to show signs when an unauthorized user tampers with a fastener, and some systems designed to apply a maximum amount of torque in turning a fastener, referred to herein as a "high torque" wrenching systems. Additionally, there are many types of configurations for tightening and loosening surfaces of fasteners and wrenches, including but not limited to, hex, double-hex, spline, star and many other fastening configurations. Producing tools made of high strength materials, such as steel, titanium and chromium alloys, and processes required for producing tools with close tolerances result in relatively high production costs and are, consequently, expensive to purchase. A single tool that may be used to turn several differently configured types of fasteners will: (i) reduce the number of tools needed by a user, (ii) reduce time expended by a user on finding different tools to mate; and (iii) reduce an overall investment in the number of tools required by the user.

It would be an advantage to provide a fastening system capable of generating sufficient torque to loosen a fastener, have a fastener and wrench design that can withstand the force of generating such torque without failing, and produce the system in the same dimensions as existing fastening systems.

It would further be an advantage to provide a wrench capable of withstanding the force of high turning torque without failing and also be capable of engaging and driving or loosing fasteners with different types of configurations.

Various wrenches and/or fasteners having ratchet teeth are known, but they differ in structure and in function from the asymmetric splines of the present invention. U.S. Pat. No. 2,685,812 (Dmitroff) discloses a torque nut having an inner nut which is internally threaded and with ratchet-like external teeth. A driving ring is disposed on the outside of the inner nut and has internal ratchet teeth made of a resilient material. As a wrench tightens the outer driving ring, the resilient teeth tighten the inner nut until slippage occurs, and the outer driving ring cannot thereafter tighten the inner nut. A greater force is necessary to loosen the constant torque nut out of necessity. Dmitroff provides an expensive constant torque due to the assembly operation of the resilient teeth of the driving ring and the ratchet teeth, and Dmitroff does not explain if the resilient teeth would also lead to slippage in a loosening operation. Dmitroff does not provide hard metal splines as in the present invention and is directed to providing a constant torque nut, rather than to providing more torque in one direction than in the other to control the loosening or tightening of a splined wrench and/or fastener relative to each other. Moreover, Dmitroff has sharp corners rather than the rounded corners in the present invention for reducing the stress between the fastener and the wrench.

U.S. Pat. No. 5,449,260 (Whittle), like Dmitroff), provides a fastener with a series of connected ratchet teeth. Whittle describes a tamper evident bolt having ratchet teeth on its exterior to receive a special socket to tighten the bolt and interior ratchet teeth in a recess in the head for receiving a ratchet tool for loosening the bolt. The angles of the ratchet teeth are apparently the same. A cap seals the recess. Evidence of tampering is the mutilation of the cap to give access to the interior teeth and mutilation of the exterior teeth if pliers are used to attempt to remove the bolt.

A splined fastener or torque tool is described in U.S. Pat. No. 3,885,480 (Muenchinger). A fastener having splines with radial walls for receiving forces perpendicular thereto to avoid force components not of the torsional effect. The walls are of the same angle for tightening and for loosening. A similar arrangement is shown in U.S. Pat. No. 4,361,412 (Stolarczyk) which discloses a wrenching configuration with spaced radial torque transfer surfaces having a drive angle of 0°. The exterior sides form a hexagon which can also be rotated with a hexagonal wrench.

Another torque-limiting tool is described in German Unexamined First Patent Application DE 40 22 763 A1 (Schneider). Schneider discloses a mechanical screwdriver incorporating a torque limiter having saw tooth-shaped ratchets projecting radially inwardly from a hollow handle and spring elements extending radially outwardly from inside the handle for contacting the steep or low-gradient flanks of the ratchet to establish preset torque values for both directions of rotation.

German Patent 306294 describes a manually-operated screw having saw-toothed shaped teeth which provide less friction to the hand during tightening than during loosening. No wrench is discussed.

Bolts are known whose heads are ruptured when torque of a certain value is reached to make them tamper proof, as in U.S. Pat. No. 5,228,250 (Kesselman). Another such bolt is described in U.S. Pat. No. 5,713,705 (Grünbichler).

U.S. Pat. No. 3,354,757 (Grimm et al.) discloses a spline wrenching system composed of splined wrenches and splined fasteners, each having slightly inclined confronting sides. The configurations are selected to achieve a tendency for mutual failure in shear over their maximum area. The confronting area in both sides of each spline is the same.

SUMMARY OF THE OF INVENTION

An object of the present invention is to provide a wrench and fastener system which is capable of transmitting more torque to the fastener for the purpose of loosening, than has hitherto been possible in the same space.

A further object is to provide a wrench which provides more removal torque than installation torque to facilitate removal of fasteners.

Another object of the present invention is to provide a spline wrench which can turn different fasteners in an improved manner over prior wrenches.

A related object of the present invention is to provide an improved spline wrench which can be used to turn double-hex fasteners, traditional spline fasteners, fasteners to which the improved spline wrench was specifically designed to turn, and hex fasteners in an improved manner giving superior engagement over prior art wrenches.

A yet further object of the invention is to provide an improved wrench for turning different types of fasteners which avoids loading of linear or sharp corners.

Still another object of the invention is to provide an improved spline wrench which reduces sensitivity to clearance.

A yet additional object is to provide an improved spline wrench which can turn corroded and painted fasteners.

Still a further object is to provide a spline wrench having no points to be damaged by poor engagement.

Still yet a further object is to provide an improved spline wrench which can be used to turn different types of fasteners.

The accomplishment of these and other objects are set forth below and disclosed in the appended claims.

The present invention in its preferred form solves these and other problems by providing an asymmetrical fastening system comprising an asymmetrical spline wrench and preferably an asymmetrical spline fastener. The fastener has a single fastening periphery and the wrench has a single fastening periphery designed to engage the fastener periphery. A plurality of low torque surfaces and a plurality of high torque surfaces are formed on the fastener fastening periphery and on the wrench fastening periphery. The system is asymmetrical as described below, and it generates more torque when force is applied on the high torque surfaces and less torque for the same amount of force on the low torque surfaces.

A high torque surface of an asymmetrical spline fastener or an asymmetrical spline wrench refers to a surface on one side of the spline which makes a smaller interior angle with a radius of the fastener or wrench intersecting the inner end than a low torque surface which makes a larger interior angle with a radius intersecting the inner end of the low torque surface. An interior angle is the acute angle formed between the tightening or loosening surface of an asymmetrical spline of a wrench or fastener according to the invention and a radius going through the inner end (that is closest to the central axis) of the surface. A force of a particular value produces more torque when applied to the high torque surface than it does when applied to the low torque surface.

In some fastener wrench systems, as noted below, it is desired that more torque be applied to loosen a fastener than to tighten it, as where the fastener is sealed, corroded, etc., and it should take more torque to loosen the fastener than to tighten it. In other situations, it is desired that the fastener not be loosened at all. Some examples of the latter situations include fasteners used to hold bridge pilings in place, fasteners used to hold cages for prisons in place, etc.

As used herein, the term radial refers to a radius extending outward in a straight line from the central axis of a fastener or a wrench. The radial forces, i.e., the forces directed along a radial vector, which tend to damage the wrench or fastener, are less when a given torque is applied in the high torque direction than when the same torque is applied in the low torque direction. The circumferential force is the same in both cases. The circumferential forces transmit torque from the wrench to the fastener and are, therefore, the ones that tighten or loosen the fastener. The radial forces add to the stresses imposed on both the wrench and the fastener and work in conjunction with the circumferential forces to increase the total forces. The result is that the torque to failure of the system in the high torque direction is greater than the torque to failure in the low torque direction.

Thus, balance in design is necessary. But greater strength for forces applied to the high torque surfaces can be achieved by designing the system to generate greater forces on the high torque surfaces without failure of the system, which requires the mechanical advantages of the system to be in favor of applying greater torque in the high torque direction. Thus, the best design is asymmetrical as explained below.

12-point fasteners have been in widespread use. However, most people who work with such fasteners say that any problem relates to the wrenches used for turning the 12-point fastener and not the fasteners themselves. This is not entirely correct. Although 12-point fasteners used in the aerospace industry are acceptable due to loading of the fastener to 50% of their tensile strength, overloading in other areas of use can be a problem. A wrench and fastener act as a combination. Doubling the teeth on a 6-point fastener does increase the torque-transmitting capabilities of the fastener by a factor of 50–75% if the across-flats dimension is not changed, but these capabilities are not doubled due to another factor—namely, wall thickness. Insufficient wall thickness will cause a socket to split. Increasing the wall thickness would cause wrenches not to fit in close quarters. The most popular use of the 12-point configuration is the allowance of reduced fastener head size, but this necessitates the use of a smaller wrench which has less strength.

Another problem of 12-point fasteners relates to the maintenance of equipment. As noted above, loss of lubrication, corrosion, etc., cause removal torque to be far greater than installation torque, usually between 100%–200% of installation torque. Even higher values are caused by damage, defective threads or an out-of-calibration torque wrench.

The present invention overcomes these problems with a new spline design. The new spline design can be used for both wrenches and fasteners.

In accordance with one preferred embodiment, the high torque surface is on the loosening side of both the fastener and the wrench; and the low torque surface is on the tightening side. There is thus provided an asymmetrical wrench that can engage an asymmetrical fastener of like size so that the fastener can be axially rotated to a loosened or tightened state. The wrench can be a socket type, a box end type wrench or an internal-key wrench type. The wrench includes a plurality of protuberances or splines and a plurality of recesses formed about a central axis in a single fastening periphery. Pursuant to the invention, a closed wrench has wrench splines extending generally radially inwardly, wherein an open wrench has wrench splines extending generally radially outwardly. The wrenching loosening surface is formed at a smaller interior angle, with respect to a radial vector extending from the wrench's central axis to the inner end of the loosening surface, than the wrench-tightening surface. The result is that the torque to failure of the system is greater in the loosening direction. Likewise according to the invention, a closed fastener has fastener splines extending generally radially inwardly, whereas an open fastener has fastener splines extending generally radially outwardly.

Another embodiment of the present invention involves an improved wrench and fastener spline system where the high torque surface is on the tightening side of the splines and the low torque surface is on the loosening side of the splines. This enables the tightening of a fastener so that it cannot be loosened using the wrench. As noted elsewhere, there are situations where fasteners should not be able to be loosened from a tightened condition. One example is fasteners used to help keep bridge pilings in place. Bridge pilings usually should never be able to be removed once installed. Jail bars may have to be tightened into walls, and the fastener should not be able to be loosened by prisoners.

A further embodiment of the invention is an improved spline wrench which can be used to turn different fasteners. In an improved spline wrench described herein, the wrench can turn 12-point fasteners, traditional spline fasteners, asymmetrical spline fasteners which the new spline wrench was designed to turn and hex fasteners. The improved spline wrench avoids corner loading and provides a snug fit. The improved spline wrench works with the foregoing fasteners even if there is a poor fit or rounded corners.

A still further embodiment of the invention involves the configuration of an improved spline wrench and improved spline fasteners where the base of the teeth has a significant amount more metal than the upper part of the teeth, giving them enhanced strength and resistance to shear failure. The configuration of the teeth gives them rounded corners as noted elsewhere, to prevent damage from points.

Another advantage of the present invention is the overall system improvement while maintaining the same size fastener head. The load transmission increases proportionally to the number of splines. Therefore, the number of splines can vary depending on the application or particular torque requirements. Additionally, more splines allow the use of a smaller head diameter for a given fastener's size because the difference between the major and minor diameters may be less.

BRIEF DESCRIPTION OF THE DRAWINGS

The invention may take physical form in certain parts and arrangement of parts, preferred embodiment of which will be described in detail in the specification and illustrated in the accompanying drawings which form a part hereof, and wherein:

FIG. 7A is an enlarged view of FIG. 7, showing in phantom form the curves for the inner and outer joining surfaces.

FIG. 7B is an exploded view of the fastener and wrench shown in FIGS. 7 and 7A.

DESCRIPTION OF A PREFERRED EMBODIMENT

Splines in spline wrenches and spline fasteners have tightening surfaces on one side of the spline and loosening surfaces on the other side of the spline.

The present invention thus provides a new type of spline fastener and spline wrench which reduces the radial forces which damage or destroy a fastener or a wrench. The new spline wrench used on a spline fastener provides a stronger system than a hex wrench for one hex diameter and a hex fastener of the same dimension. Moreover, the new spline wrench can be used on hex fasteners, double-hex fasteners, spline fasteners and asymmetrical spline fasteners as discussed herein. The new spline wrench transmits more torque to double-hex fasteners than traditional double-hex wrenches.

As noted earlier, one embodiment provides a fastener and a wrench which provides more torque in the loosening direction. To generate the adequate torque to loosen a fastener, the asymmetrical spline generates torque in the loosening direction that is greater than the torque in the tightening direction. By utilizing such an asymmetrical system, greater torque can be supplied to loosen a fastener than can be supplied by known systems. In the preferred embodiment, the greater torque is primarily achieved in two ways. First, the interior angle of the loosening surfaces are relatively close to a radius at the inner end of the loosening surface, thereby directing most of the loosening force applied by the wrench along a circumferential vector, which generates a high-loosening torque. Second, the tightening surfaces are formed at a greater interior angle with respect to a radius at the inner end of the tightening surface. This provides less torque to tighten the fastener. Further, the greater interior angle for the tightening surface provides for more basal shear area in the fastener surface. This allows more torque to be applied to the fastener in both directions.

The latter preferred embodiment of the invention, discussed in detail below, achieves the benefits disclosed herein by providing a fastening system comprising an asymmetrical fastener and an asymmetrical wrench specifically designed to engage the fastener. The invention is not, however, limited to the specific designs disclosed herein. Similar results can be achieved by providing fastener-loosening surfaces and fastener-tightening surfaces having different heights (relative the center of the fastener) or different interior angles relative the radii to create a different moment in the loosening direction than in the tightening direction when engaged by a wrench. Further, different moment arms for loosening and tightening could be created by other fastener and/or wrench structures that enable the loosening surface of the wrench to contact the loosening surface of the fastener at a position further from the center of the fastener than where the tightening surface of the wrench contacts the tightening surface of the fastener.

Figure 13:
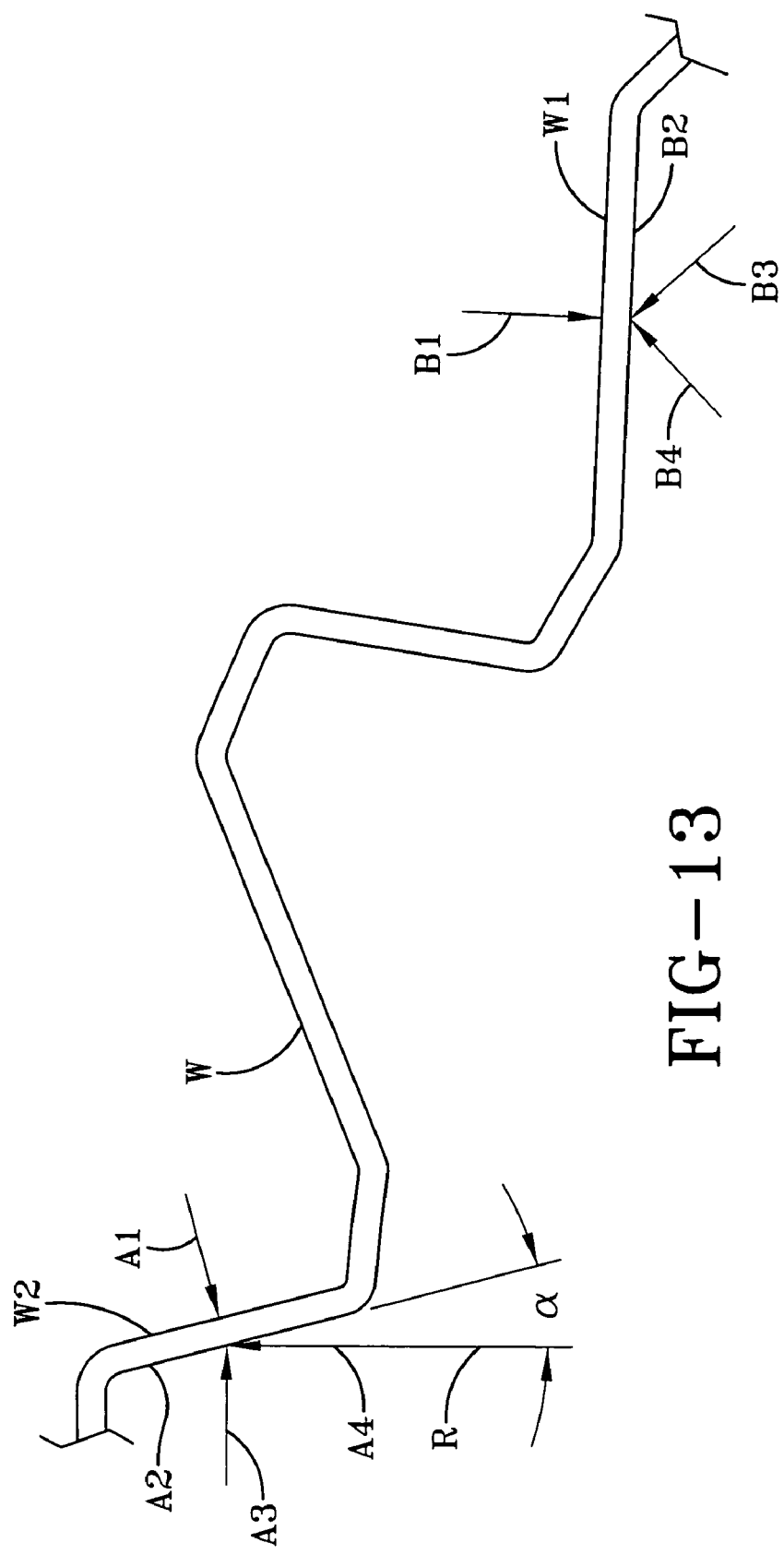
FIG. 13 is a schematic view showing force vectors from the engagement of an asymmetrical spline wrench with an asymmetrical spline fastener according to the invention.

Prior to discussing the foregoing preferred embodiment in detail, FIG. 13 depicts the forces acting on the surfaces of a fastener made according to one embodiment of the invention. As used herein, radial forces are those directed along a radius (also called a radial vector) extending outward in a straight line from the center of the fastener and circumferential forces are those directed along a vector perpendicular to radial. It is the circumferential forces that generate torque to turn the fastener. The radial forces act only to deform the loosening surfaces or tightening surfaces or to split the outer member whether it be a wrench or fastener. Force A1 is shown acting on a fastener-loosening surface A2 formed at an interior angle α close to radial vector R. As the loosening surface of a wrench W1 transmits force A1 against fastener-loosening surface A2, two force vectors, circumferential force A3 and radial force A4, components of the reactive force, are generated against the wrench-loosening surface W2.

The forces shown at B are acting on a tightening surface B2 of the fastener. As the tightening surface of a wrench W1 transmits force B1 against fastener-tightening surface B2, two reactive force vectors, circumferential force B3 and radial force B4 are generated against the wrench-tightening surface W1. Because of the differences in the interior angles of surface A2 and surface B2, when force A1 equals force B1, force A4 is less than force B4. Therefore, the loosening torque is greater than the tightening torque.

Figure 3:
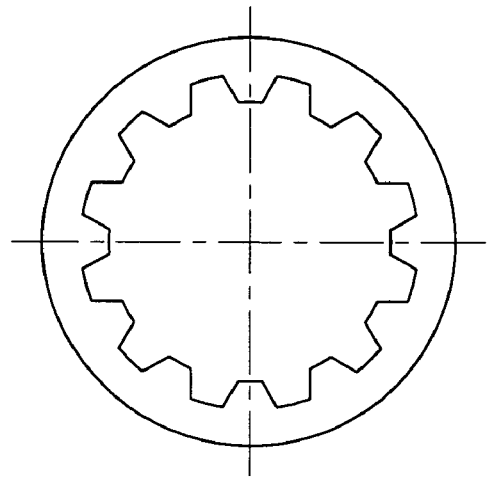
FIG. 3 is a front view of a 1" 12-point wrench socket spline according to the prior art.
Figure 2:
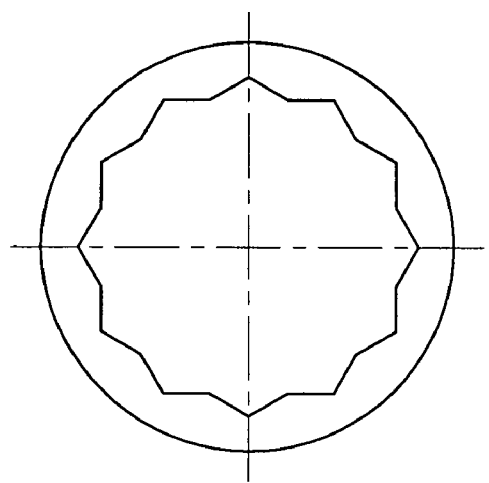
FIG. 2 is a front view of a 1" 12-point wrench socket according to the prior art.
Figure 1:
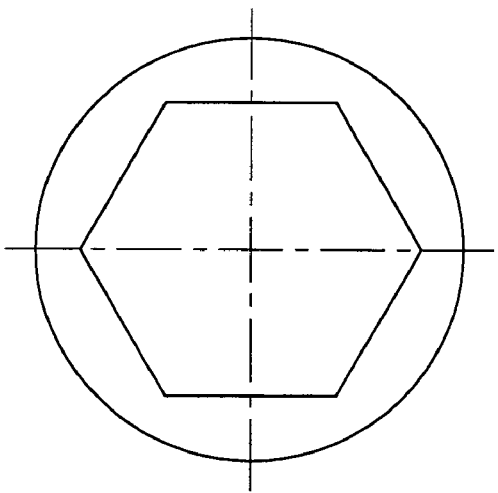
FIG. 1 is a front view of a 1" Hex wrench socket according to the prior art.
Figure 4:
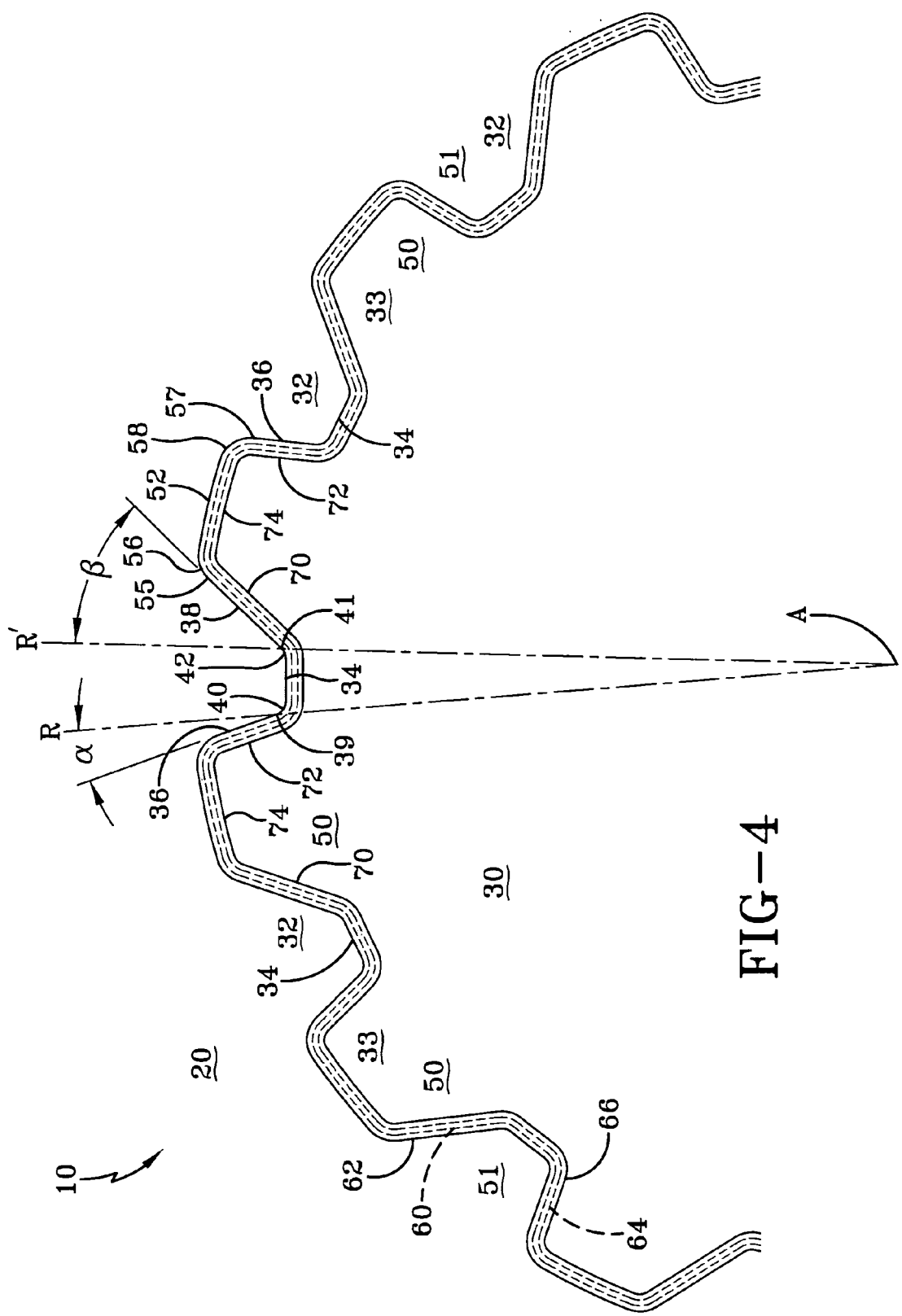
FIG. 4 is an enlarged view of an asymmetrical wrench and an asymmetrical fastener according to the invention represented in outline form.

Referring now to the drawings for the purpose of illustrating the preferred embodiment of the invention only, and not for the purpose of limiting same, FIG. 4 shows the invention in one of its preferred forms. An asymmetrical fastening system 10 is comprised of an asymmetrical wrench 20 presented in an outline form which, although shown as a closed-end wrench, could be an open-end wrench, and a mating asymmetrical fastener 30. Wrench 20 is a 15-point wrench, and fastener 30 is a 15-point fastener (although they do not have "points" as discussed below). 12-point wrenches and fasteners are expected to be more common, and examples of which are discussed below. Standard wrenches and fasteners have a minimum and maximum cross flats dimension established by industry standards. These minimum and maximum dimensions require a maximum and minimum material, respectively. Wrench 20 has a maximum material (or maximum material condition) 60 and a minimum required material (or minimum material condition) 62. Fastener 30 has a maximum material 64 and a minimum material 66. The wrench and fastener must each be within the minimum and maximum tolerances to be categorized within a specified head size.

Wrench 20 is comprised of fifteen uniformly peripherally spaced splines 32 and fifteen uniformly peripherally spaced recesses 50 formed along a single wrench-fastening periphery. No aspect of the invention is limited, however, to a wrench or fastener having any particular number of recesses, splines, fastening surfaces or loosening surfaces. Nor is the invention limited to a system wherein the number of loosening surfaces on the fastener is equal to the number of loosening surfaces on the wrench, or the number of tightening surfaces on the fastener is equal to the number of tightening surfaces on the wrench. Furthermore, the wrench or the fastener, or both, may have fewer tightening surfaces than loosening surfaces or fewer loosening surfaces than tightening surfaces.

Referring again to FIG. 4, each wrench spline 32 is preferably located equidistant from a central axis A and each wrench recess 50 is located equidistant from the central axis A. Fastener 30 is also a 15-point fastener and comprises fifteen uniformly peripherally spaced splines 33 and a plurality of uniformly peripherally spaced recesses 51 formed along a single fastening periphery, having the same shape, respectively, as the splines and recesses of the wrench. The splines of the fastener are located equidistant from the central axis A and each recess of the fastener is located equidistant from the central axis A. The splines of the wrench fit in and are engageable with the surfaces defining the recesses of the fastener and the splines of the fastener fit in and are engageable with the surfaces of the recesses of the wrench. The splines are slightly smaller than the recesses to make engagement possible.

The splines are essentially identical for both the wrench and the fastener, and only one of the splines of the wrench and of the fastener needs to be described in detail. It should be understood that the splines of the wrench extend inwardly (toward the axis), while the splines of the fastener extend outwardly (away from the axis), so that the surfaces described for the wrench will be diametrically opposed to the surfaces of the fastener. Spline 32 of wrench 20 has an inner generally circumferential joining surface 34 that connects a wrench-loosening surface 36 and a wrench-tightening surface 38. Wrench-loosening surface 36 and wrench-tightening surface 38 interface with a fastener-loosening surface 72 and a fastener-tightening surface 70, respectively, on fastener 30. Fastener-loosening surface 72 is connected to fastener-tightening surface 70 by an outer fastener surface 74. Inner joining surface 34 of wrench 20 extends from a first point 39 which is the end of a curve having a relatively small radius connecting wrench-loosening surface 36 to a second point 41. Second point 41 is the end of a curve having a relatively large radius connecting inner joining surface 34 and wrench-tightening surface 38. The ends of inner joining surface 34 thus converge with the wrench surfaces 36 and 38, and are joined together by a pair of arches 40 and 42 having the radii just discussed. Wrench-loosening surface 36 forms an interior angle α, which in this example is an interior angle of about 21° with respect to radius (also called a radial vector) R. Radius R goes through the inner end of tightening surface 36. Wrench-tightening surface 38 forms an interior angle β, which in this example is about a 60° interior angle with respect to radius R' extending through the inner end of surface 38. The result is that the circumferential force and torque for loosening is greater than the circumferential force and torque for tightening, given an equal force applied to the wrench for loosening and tightening. Furthermore, the radial force in the loosening direction is less than the radial force in the tightening direction, given an equal force applied to the wrench for loosening and tightening. Because of the differences in these forces, contributable in this one preferred embodiment to the different interior angles, respectively, of the loosening surfaces and tightening surfaces, the torque to failure of the system (failure of either the fastener or the wrench) is greater in the loosening direction than in the fastening direction. This is a benefit because, as previously mentioned, substantially more torque is required to loosen the fastener and the system still generates adequate torque to tighten the fastener properly. Because the present system can generate more torque in the loosening direction without failure, it is less likely to fail overall.

The recesses are essentially identical for both the wrench and the fastener and only one of the recesses of the wrench will be described in detail. It should be understood that the recesses 50 of the wrench extend outwardly (away from the central axis A), while the recesses 51 of the fastener extend inwardly (toward the axis A) so that the surfaces described for the wrench will be diametrically opposed, with respect to the fastener. Recess 50 has an outer circumferential joining surface 52 that connects wrench-tightening surface 38, which is part of spline 32, with a second wrench-loosening surface 36 of an adjoining spline. Outer circumferential joining surface 52 extends equidistantly along a given circumference from a first point 55 where it intersects the wrench-tightening surface 38 to a second point 57, where it is joined at second wrench-loosening surface 36. The ends of outer radial joining surface 52 converge with wrench surfaces 38 and 36, and are joined by a pair of arches 56 and 58.

As can be seen in FIG. 4, spline 32 and adjoining recess 50 form a complete section for mating with a corresponding recess 51 and a corresponding spline 33 of a fastener. These sections are preferably repeated radially and preferably equal the number of points of the mating fastener forming a saw-tooth type or ratchet-type shape. In this embodiment, there are 15 points but the invention could have 8, 10, 12 or a different number of points depending on the application, head size and torque requirements. It should be understood that different interior angles α and β could be chosen according to desired head size, number of points and torque requirements. In all cases the loosening surface would require a smaller interior angle than the tightening surface.

Figure 5:
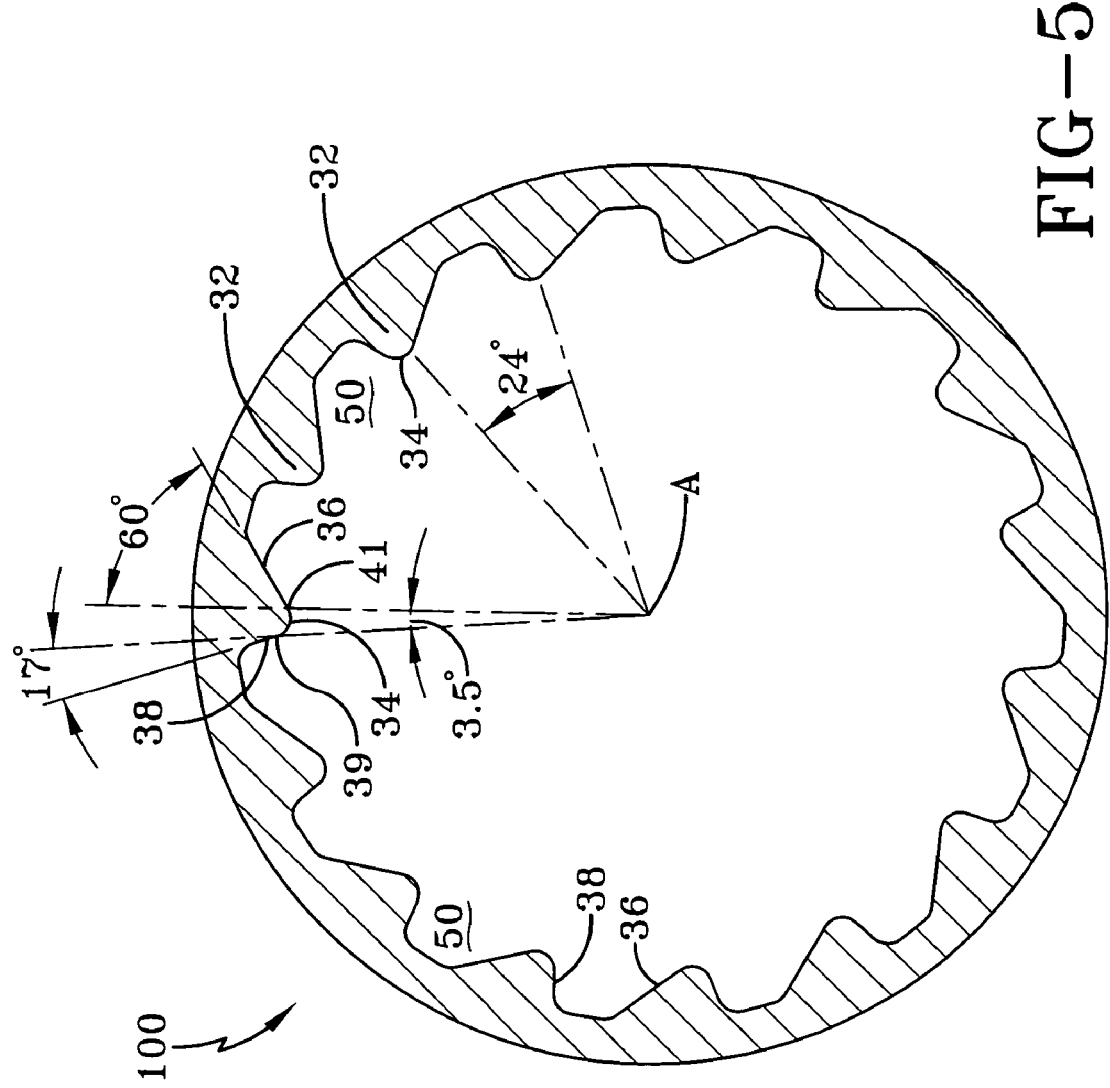
FIG. 5 is a cross-sectional handle-end view a 15-point asymmetrical spline socket according to the invention.
Figure 6:
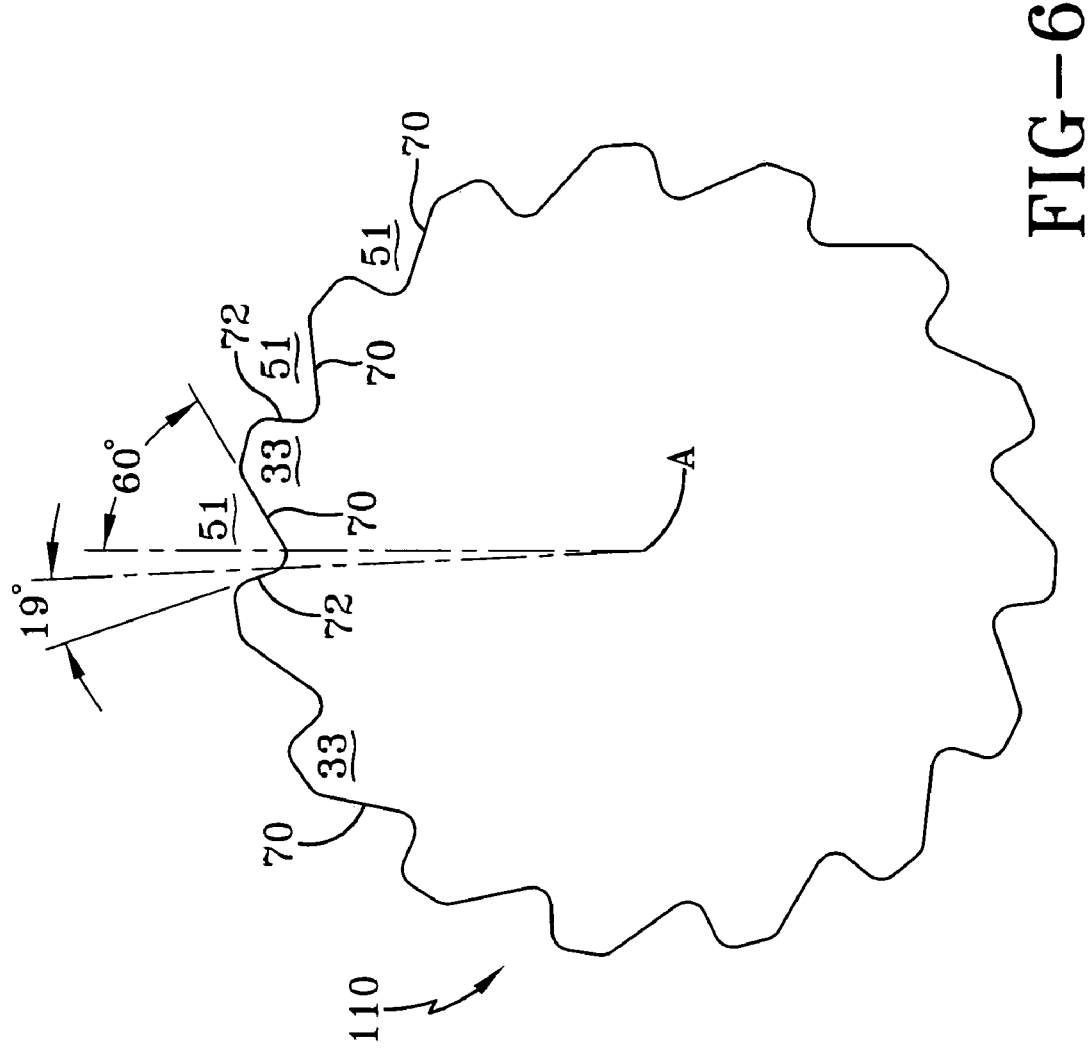
FIG. 6 is a top or socket-end view of a 15-point fastener mate for the wrench socket shown in FIG. 5.

For example, FIG. 5 shows a socket end wrench 100 (alternatively, a box wrench could be used) having 15 points and a mating fastener head 110 shown in FIG. 6. Referring now to socket end wrench or socket head 100, where like numerals denote like parts, socket head 100 comprises a plurality of splines 32 and recesses 50, as described previously, each having a wrench-tightening surface 36 and a wrench-loosening surface 38. The wrench-tightening surfaces 36 have an interior angle of 60° away from a radius extending from a central axis A, like the previously described embodiment; however, the wrench-loosening surfaces 38 are at an interior angle of about 17° with respect to a radius extending through the inner end of surface 38. The steeper (or lower) interior angle increases the torque transmission capability in the loosening direction of this embodiment. The torque transmission capability is greater as the angle α shown in FIG. 4 decreases. Each spline 32 is spaced apart at about 24° interior angles from each adjoining spline. In this particular embodiment, inner joining surface 34 extends circumferentially from points 39 to 41 over an interior angle of about 3.5°.

Referring now to the fastener 110 shown in FIG. 6, where like numerals denote like parts, socket fastener 110 is comprised of a plurality of fifteen splines 33 and fifteen recesses 51, as described previously, having fastener-tightening surfaces 70 and fastener-loosening surfaces 72. The fastener-tightening surfaces 70 have an interior angle of 60° away from radii extending from a central axis through the inner end of surface 70, and fastener-loosening surfaces 72 are at about a 19° interior angle with a radius extending from the central axis through the inner end of surface 72. Fastener 110 is an open fastener in that its splines extend generally radially outwardly.

It should be appreciated that the number of splines of the wrench and number of points or splines on the fasteners can vary depending on the shape, size, hardness of the fastener, and the application being facilitated. Smaller heads can be used as the number of points or splines increase because more teeth or splines will allow for a smaller diameter head. However, smaller teeth or splines require more precise manufacturing. Increasing the number of teeth or splines can increase the amount of torque because there is a greater area over which to spread the forces, which reduces the probability of failure. As noted elsewhere, increasing the number of teeth or splines can limit the wall thickness which could lead to failure.

It should also be appreciated that the system described above is a preferred embodiment for increasing the torque to failure in the loosening direction. A standard design of a 12-point or higher fastener, depending on the details of its construction, including head height and material hardness, may not have sufficient wrenchability to fully utilize the properties of the fastener. However, using a larger cross flats dimension on a 12-point fastener would increase the torque transmission capability and improve the systems overall wrenchability, making it possible to fully utilize the properties of the fastener. For example, if the 12-point fastener is made with a cross flats of 1.3 or 1.5 times the bolt diameter, its wrenchability problems would be solved and designs originally made with hexagonal headed fasteners could be upgraded and standard wrenches used. The current invention provides a way around this problem while still preserving the smaller fastener heads.

Figure 7:
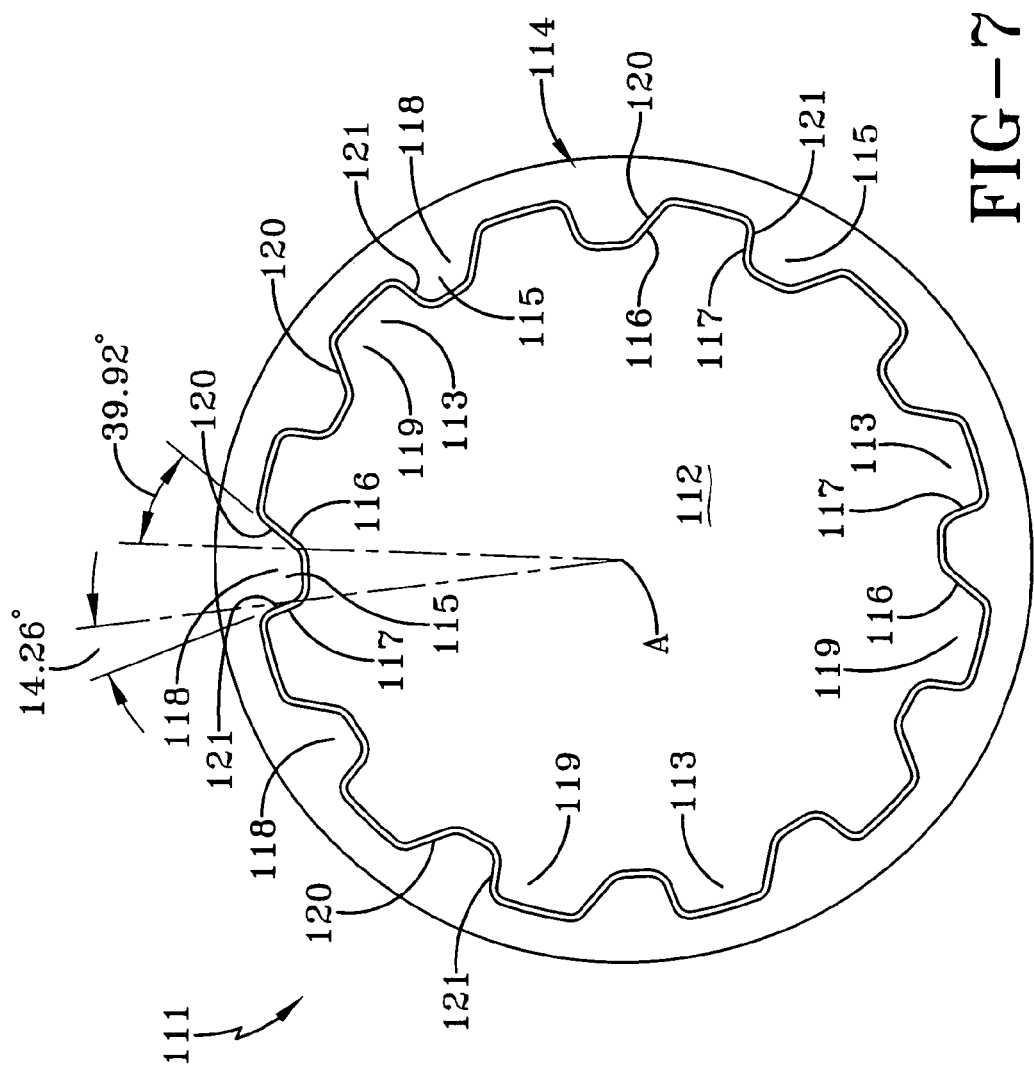
FIG. 7 is a cross-sectional handle-end view of a 12-point socket asymmetrical spline wrench in accordance with the invention.

A system 111 according to the invention comprising 12-point asymmetric spline fastener 112 engaged by a 12-point asymmetric spline wrench 114 is shown in FIG. 7. System 111 has closed asymmetric wrench 114 and open asymmetric fastener 12. Fastener 112 has twelve splines 113 with alternating recesses 115. Each fastener spline 113 has a tightening surface 116 and a loosening surface 117. Each fastener recess 115 has tightening surface 116 and loosening surface 117, the same as the respective splines. Wrench 114 has twelve wrench splines 118 disposed in recesses 115 of fastener 112, and twelve alternating wrench recesses 119 which receive the respective splines 113 of fastener 112. Wrench splines 118 have tightening surfaces 120 and loosening surfaces 121, and wrench recesses 119 have the same tightening surfaces and loosening surfaces as do the splines. For the example shown in FIG. 7, tightening surfaces 116, 120 have an interior angle of 39.92° with respect to a radius extending from axis A going through the end of tightening surfaces 116, 120, and surfaces 117, 121 make an interior angle of 14.26° with a radius extending through the end of loosening surfaces 116, 120. (In this example, as in other examples, the maximum material condition is for the respective dimensions given.)

It should also be appreciated that this fastening system could be, applied to internal wrenching systems such as that found in hollow head cap screws such as "Allen" fasteners and internal-key wrenches. This can be done by interchanging the wrench and the fastener so that the wrench element is inside the hollow head of the fastener. In this configuration, the number of points on the fastener and wrench are likely to be smaller to facilitate manufacturing, because the fastener-loosening surfaces and fastener-tightening surfaces are formed on a fastening periphery inside of the outer perimeter of the fastener, whereas previously the fastening perimeter was the outer perimeter of the fastener. This design is referred to as an internal wrenching configuration. A nut cannot be made with an internal wrenching configuration because it must have an external wrenching configuration, wherein the fastener-loosening surfaces and fastener-tightening surfaces are formed on the outer perimeter of the fastener, because space must be left for the tapped hole in the nut. In an internal wrenching configuration larger teeth can be used in the fastener periphery formed in the interior of the fastener because the fastener is not limited by the requirement for internal space in which to place a hole.

Referring to FIGS. 7A and 7B, fastener 112 has a circumferential inner joining surface 162 interconnecting the inner ends of adjacent fastener tightening surfaces 116 and fastener loosening surfaces 117. Fastener 112 also has a circumferential outer joining surface 164 interconnecting the outer ends of fastener tightening surfaces 116 and fastener loosening surfaces 117. Wrench 114 has corresponding structure. Wrench 114 has a circumferential inner joining surface 166 interconnecting the outer ends of wrench tightening surfaces 120 and wrench loosening surfaces 121. There are finally circumferential inner joining surfaces 168 interconnecting the inner ends of wrench tightening surface 120 and wrench loosening surface 121.

Fastener inner and outer joining surfaces 162, 164 and wrench inner and outer joining surfaces 166 and 168 have a slight curvature, similar to circumferential joining surfaces 34 and 52 in FIG. 4, which is shown more clearly in FIGS. 7A and 7B. A radius of curvature $R_w$ is the radius of curvature for the inner wrench joining surfaces 168 and $R_w+n$ is the radius of curvature for outer wrench joining surfaces 166. "n" is the difference in the lengths of the two radii. Corresponding radii exist for each of the other joining surfaces.

Figure 8:
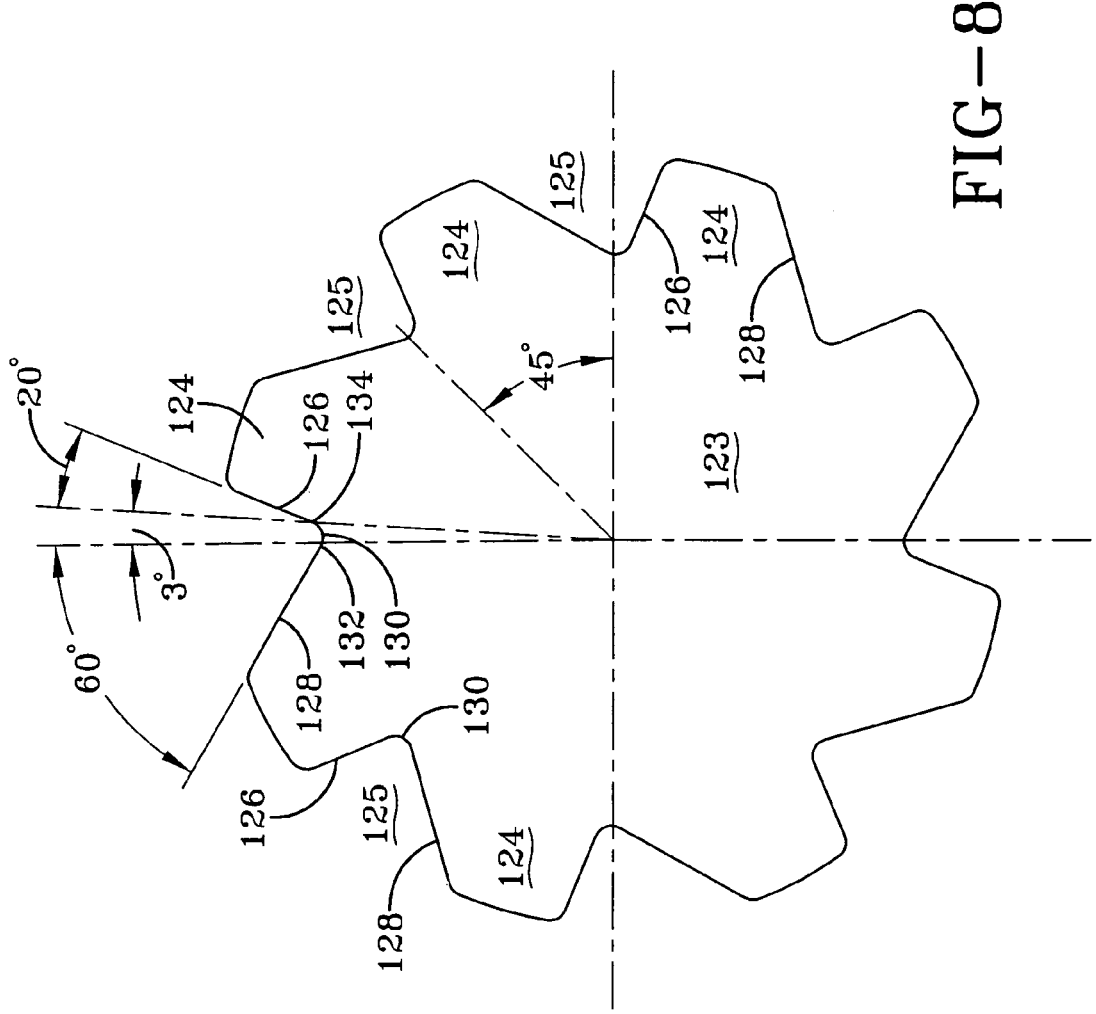
FIG. 8 is a top or handle-end view of an 8-point internal asymmetrical spline wrench according to the invention.
Figure 9:
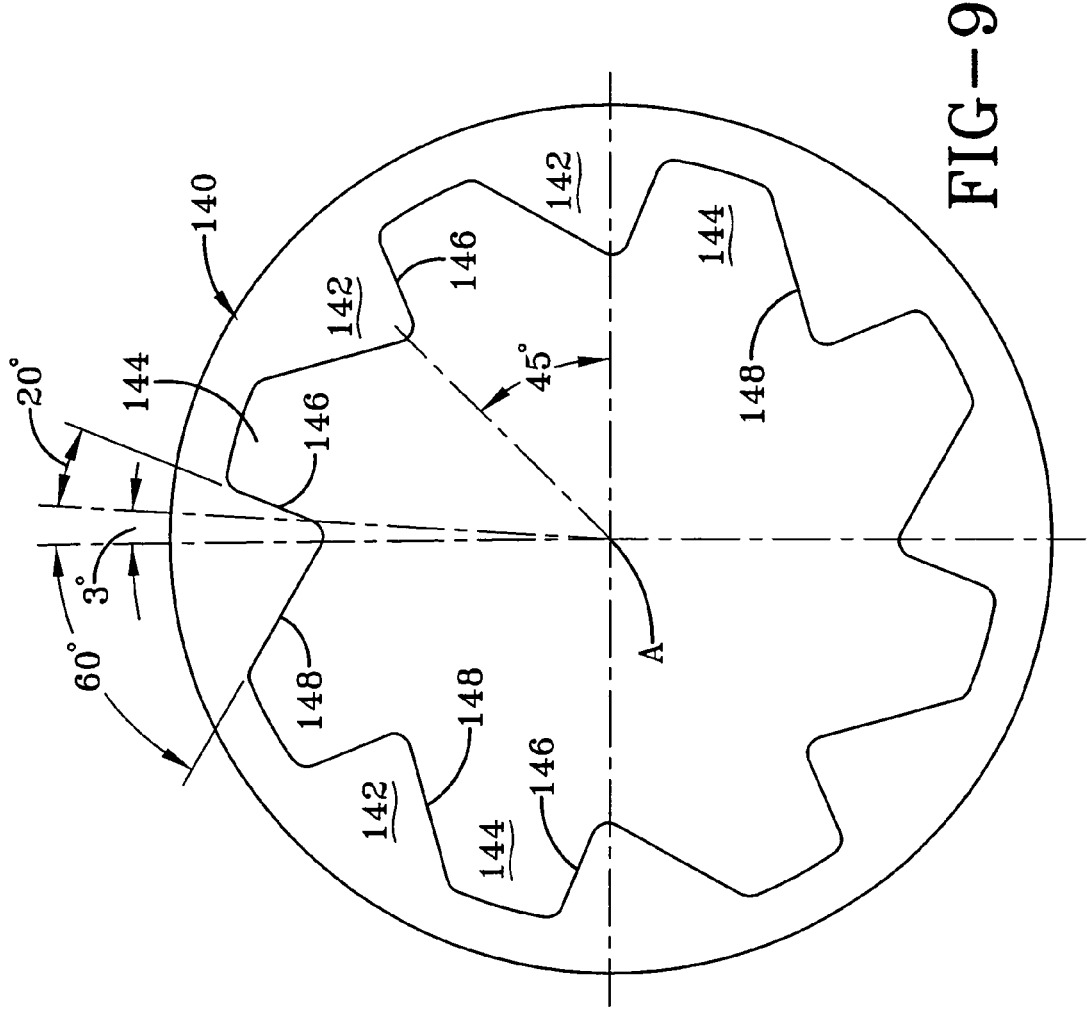
FIG. 9 is a top or handle-end view of an 8-point internal fastener to be turned by the wrench shown in FIG. 8.

Referring to FIG. 8, this figure shows an internal or open wrench 123 used for mating a hollow head cap screw 140 shown in FIG. 9. Internal wrench 120 and mating hollow head cap screw 140 each have 8 fastening points. Internal wrench 120 is comprised of a plurality of outwardly directed splines 124 and inwardly directed recesses 125, each having a wrench-tightening surface 128 and a wrench-loosening surface 126. Wrench-tightening surfaces 128 preferably have an interior angle of 60° away from radii extending from a central axis through the inner end of surface 128, and the wrench-loosening surfaces 126 are preferably at an approximately 20° interior angle with radii extending from the central axis through the inner end of surface 126, like the previously-described embodiment. Each spline 124 is spaced apart at a 45° interior angle from each adjoining spline. In this particular embodiment, inner joining surface 130 extends circumferentially from points 132 to 134 over an interior angle of about 3°.

Referring now to mating hollow head cap screw 140 which is a closed fastener, shown in FIG. 9, it is comprised of a plurality of inwardly directed splines 142 and outwardly directed recesses 144, as described previously, having fastener-tightening surfaces 148 and fastener-loosening surfaces 146. The fastener-tightening surfaces 148 have an interior angle of about 60° away from a radii extending from a central axis through the inner end of surface 148, and fastener-loosening surfaces 146 are at an approximate interior angle of about 20° with a radii extending from the central axis through the inner end of surface 146, as described in mating wrench 123. The angle between the inner joining points is 3°. General tolerances with respect to the 3°, 60° and 20° interior angles would of course apply.

Figure 10:
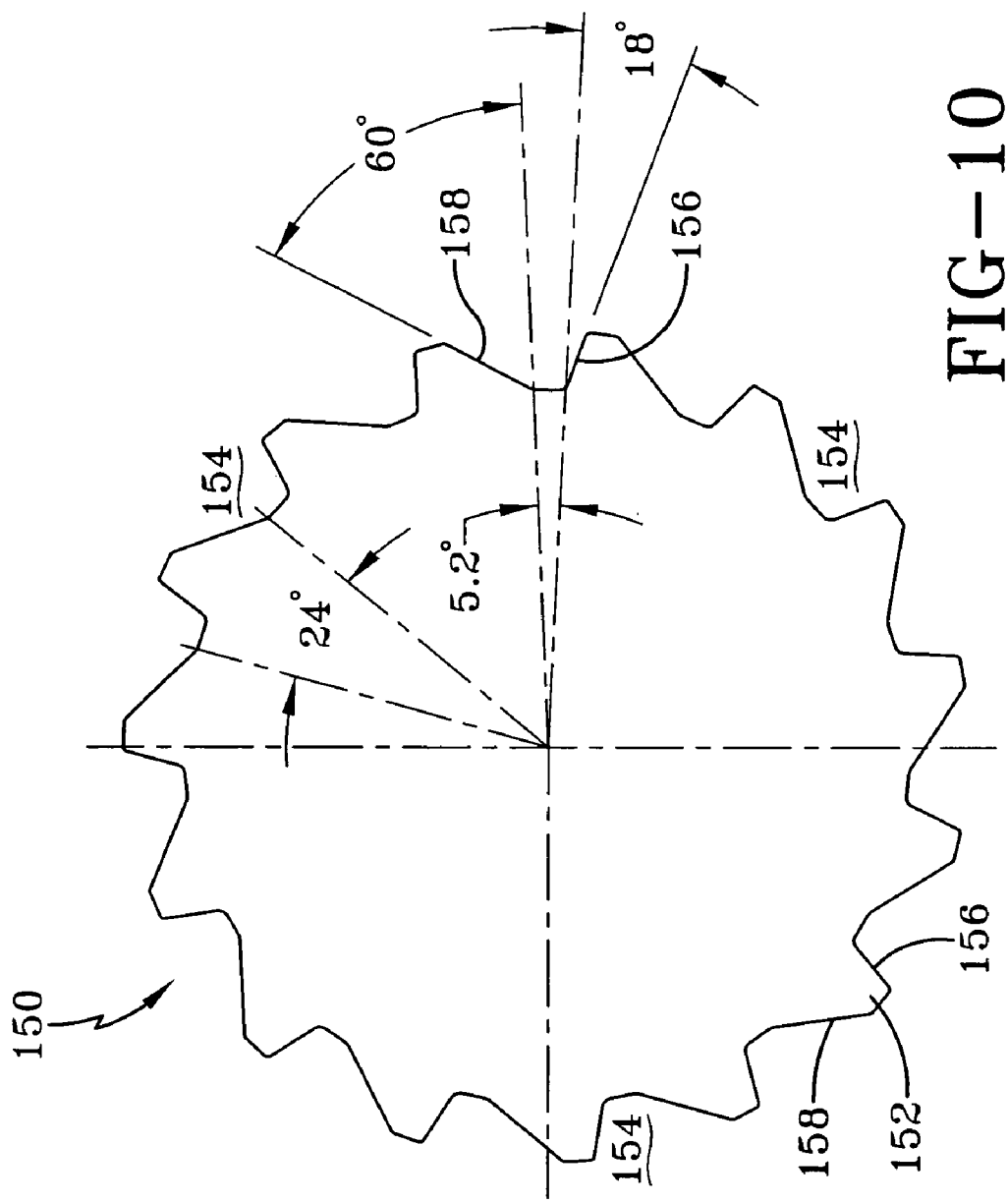
FIG. 10 is a top or socket-end view of a 15-point fastener for high torque tightening.
Figure 11:
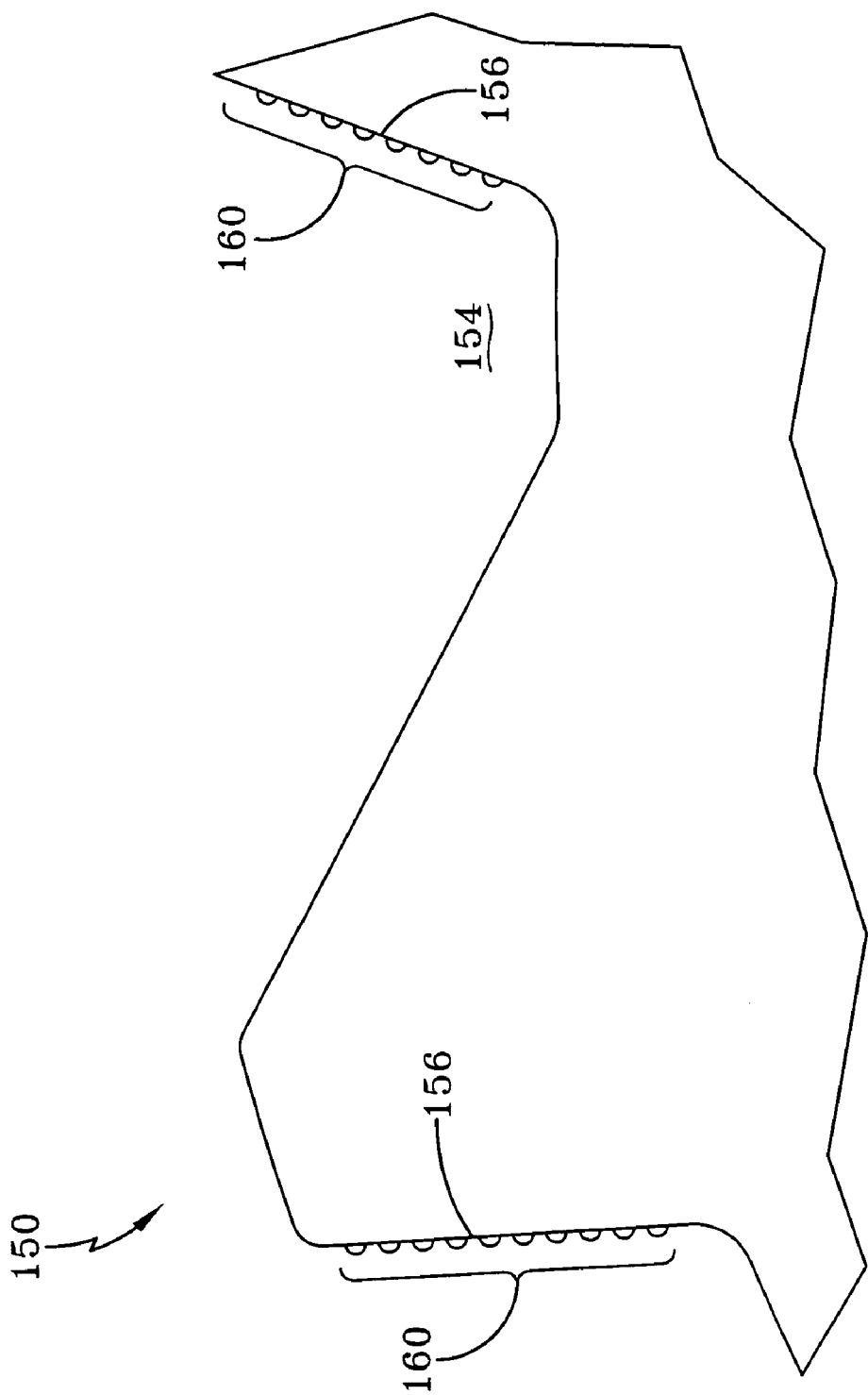
FIG. 11 is an enlarged top or handle view of FIG. 10 including ridges on the tightening surface.

Referring now to FIG. 10, a fastener 150 is comprised of a plurality of fifteen splines 152 and fifteen recesses 154, having a fastener-tightening surfaces 156 and fastener-loosening surfaces 158. Fastener 150 can be seen to be another embodiment of the invention, wherein the tightening surfaces are at a lower interior angle with respect to a radius extending through the inner end of the tightening surface than are the interior angles which the loosening surfaces 158 make with the radii extending through their inner ends. This is for the situation where one does not want the fastener to be removed once it has been turned to a tightened state. The fastener-tightening surfaces 156 each have an interior angle of about 18° away from radii extending respectively from a central axis through the inner end of tightening surface 156, and fastener-loosening surfaces 158 are at a 60° interior angle with radii extending respectively from the central axis to the inner end of surfaces 158. The angle between the two points at the inner end of the fastener-loosening surface and the inner end of the fastener-tightening surface is 5.2°. Again, general tolerances would apply to the respective interior angles. For all practical purposes fastener 150 is a mirror image of fastener 110 shown in FIG. 6. For fasteners that will not be removed, loosening wrenching surfaces 158 are only used for backside support for the torque transmitting surfaces. As can be seen in FIG. 11, a plurality of ridges or projections 160 may be formed on tightening surface 156 of fastener 150. Ridges 160 deform when sufficient load is applied during the tightening process. Determining whether sufficient load has been applied can be done by visual inspection for large fasteners, or by use of a gage (not shown) for small fasteners that would only fit on the fastener if the projections were sufficiently deformed. Such ridges or protrusions could also be formed in the corresponding surfaces of fasteners disclosed earlier where a higher torque is necessary in the loosening direction than in the tightening direction.

Figure 12:
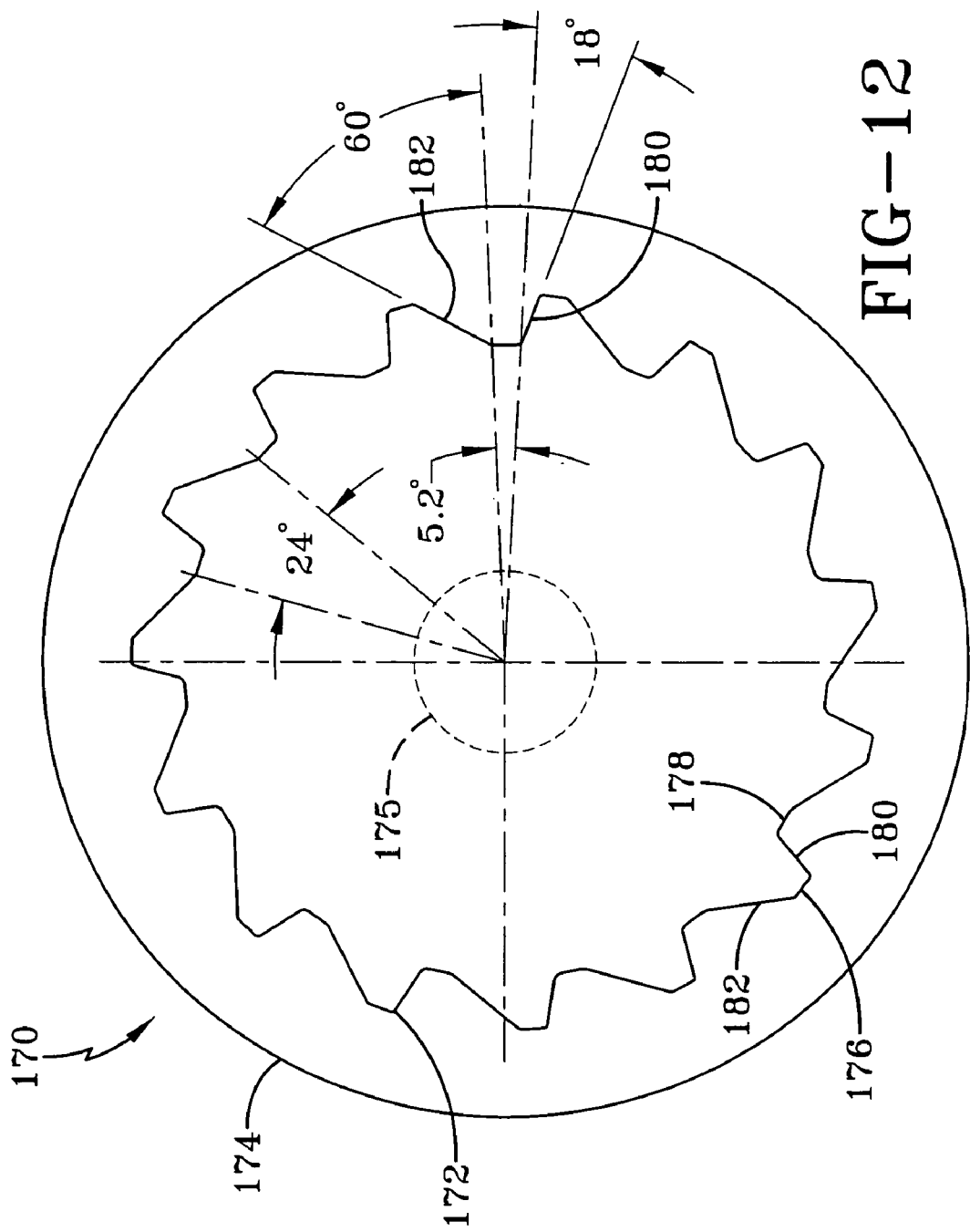
FIG. 12 is a top view of a 15-point two-headed fastener according to the invention.

The current invention is not limited to single headed fasteners. As shown in FIG. 12, a two-headed fastener 170 is provided having an upper head 172 and a lower head 174 attached to one another by a neck 175 (shown by dashed lines). Upper head 172 is a high torque configuration head essentially identical to fastener 150 depicted in FIG. 10. Upper head 172 includes a plurality of splines 176 and a plurality of recesses 178, having fastener-tightening surfaces 180 and fastener-loosening surfaces 182. As before, fastener-tightening surfaces 180 are at a much smaller interior angle than fastener-loosening surfaces 182 with respect to radii going through the inner ends of the respective surfaces. Lower head 174 has a round circumference such that it can engage the surface it is tightened on, but cannot be removed. It should be appreciated that if it is desired to remove fastener 170, a head can be used similar to the head of fastener 110 of FIG. 6. The lower head could also be shaped in a configuration specifically adapted to a special removal tool. In using fastener 170, a matching wrench is placed over fastener head 172 and turned in the tightening direction. Once lower head 174 engages with the surface that fastener 170 is being fastened to and sufficient torque is applied, upper head 172 and neck 175 are severed from lower head 174. The security of fastener 170 can be further enhanced by enclosing lower head 174. The security of fastener 170 can be further enhanced by enclosing lower head 174 in a countersunk hole.

In addition, for any of the fastening systems used in the practice of the invention, the respective interior angles of the loosening surfaces and tightening surfaces of the fastener may be different than the respective interior angles of the loosening surfaces and tightening surfaces of the wrench. Preferably, the interior angles of the loosening surfaces of the fastener should be designed to be equal to, or vary up to 3° from the corresponding interior angle of the loosening surfaces of the wrench. The interior angle of the tightening surfaces of the fastener is preferably equal to the corresponding interior angle of the tightening surfaces of the wrench.

Figure 14:
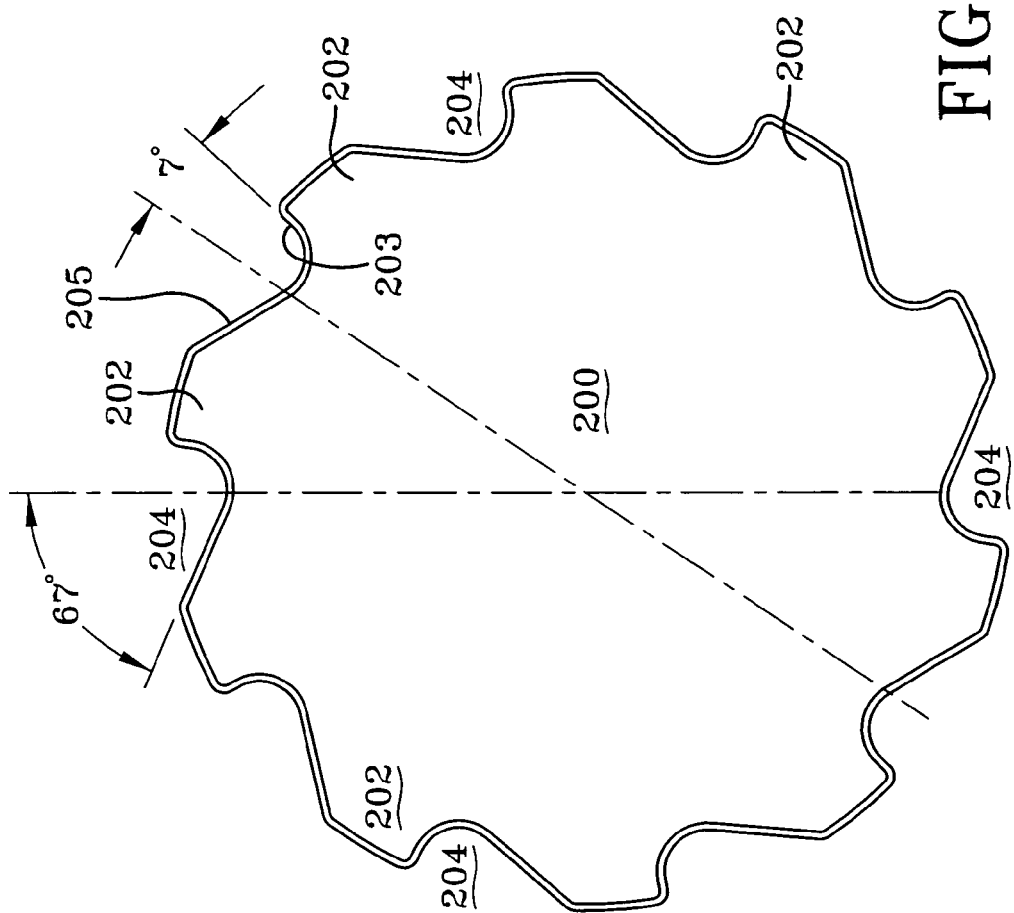
FIG. 14 is a front view of a ten-point internal key wrench in accordance with the invention.

FIG. 14 shows a ten point internal-key wrench 200 according to the invention. Wrench 200 has ten splines 202, which are preferably of the same or similar configuration as previously described splines 32. Wrench 200 also has ten recesses 204, which are preferably of the same or similar configuration as previously described recesses 50. Wrench 200 is designed to engage, preferably, a ten-point fastener (not shown) having ten splines and ten recesses having the same configurations as the previously described splines 32 and recesses 50. Wrench 200 has a loosening surface 201 making an interior angle of about 7° with a radius through the inner end of a tightening surface 205. Tightening surface 203 makes an interior angle of about 67° with a corresponding radius to its inner end. It too should not be able to be loosened once it is fully tightened. This embodiment (or theoretically any of the disclosed embodiments) could utilize a loosening surface having a 0° interior angle with respect to radial to generate less radial force.

Figure 15:
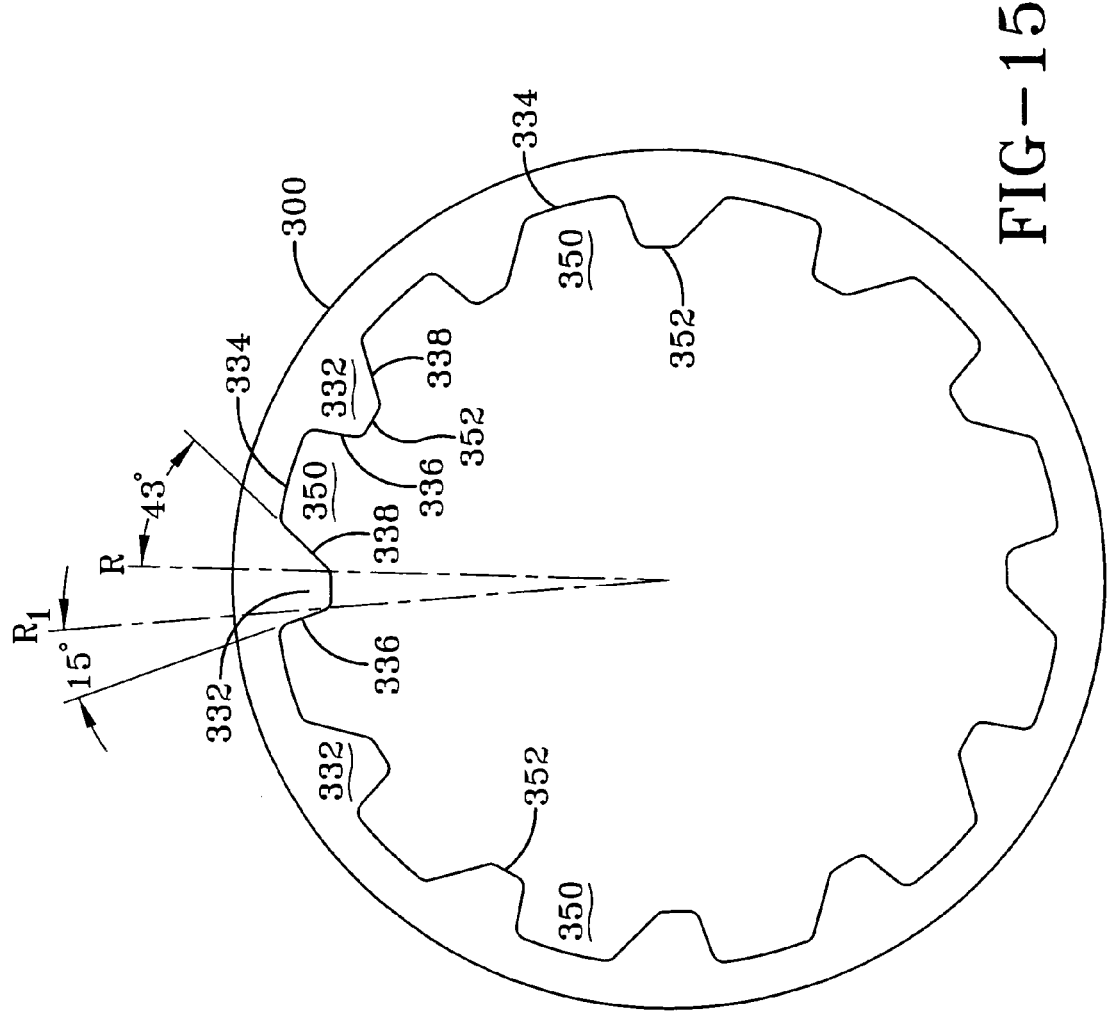
FIG. 15 is top view of an asymmetrical spline wrench for engaging multiple fastener configurations according to one embodiment of the invention.

Referring to FIG. 15, asymmetrical spline wrench 300 is shown for engaging and turning multiple types of fastener configurations. It is known that some standard symmetrical 12-point spline wrenches may be used to turn fasteners with different configurations. Notably, a symmetric 12-point spline, e.g., Snap-on® 12-point splined wrench, may be used to turn fasteners having one of a hex, double-hex and corresponding symmetric 12-point spline configuration. The conventional symmetric 12-spline wrench is known to be effective for removing double-hex fasteners requiring high removal torque and/or where the fastener is often damaged from previous use, corrosion, and/or coated with paint or anti-corrosion sealant, any of which make wrenching more difficult. The conventional symmetrical spline wrench does not, however, provide any capability to generate a greater torque to failure in one of the tightening or loosening directions than in the other direction as does the present inventive wrenches, fasteners and/or combinations.

When asymmetrical spline wrench 300 may also engage and turn fasteners having one of a hex, double-hex and symmetric 12-spline fastener configurations. Wrench 300 may additionally engage and turn the asymmetrical fasteners disclosed herein with greater torque to failure in one of the loosening or tightening directions as described above. Moreover, asymmetrical spline wrench 300 is better adapted, than the conventional spline wrench, to turning standard double-hex headed fasteners and hex-headed fasteners because it will accept and dig through coatings or rust more effectively than the symmetrical 12-spline wrench. Because of the orientation of the tightening and loosening surfaces, asymmetrical spline wrench 300 facilitates improved accommodation of severely deteriorated fastener points (e.g., rounded corners) and still delivers a high amount of removal torque before failure of the fastener and/or wrench 300 and adequate tightening torque before failure of the same.

Asymmetric spline wrench 300 preferably includes a 12-point or 12-spline configuration because twelve is the number of lobes or points that many existing fasteners have, e.g., double-hex (or 12-hex) and 12-point spline fastener configurations.

In the example illustrated in FIG. 15, wrench 300 includes alternating splines 332 and recesses 350 forming respective loosening surfaces 336 and tightening surfaces 338. It is noted that, as with all embodiments described herein, a right-handed fastener thread orientation is assumed although not required. Consequently, tightening is described in a clockwise rotation and loosening in a counter-clockwise rotation. For enabling wrench 300 to turn multiple fastener configurations, each tightening surface preferably forms a tightening interior angle, with respect to radial vector R extending through the inner end of surface 338, of approximately 43° and a loosening interior angle of approximately 15° with respect to a radial vector $R_1$ extending through the inner end of surface 336. The respective tightening and loosening interior angles for wrench 300 are modified from those previously described to facilitate wrench 300 engagement with multiple types of fastener configurations. Consequently, the disclosed interior angles and others within a range of ±5° are not merely choices in ornamental or aesthetic design, but facilitate the possibility for wrench 300 to engage and turn fasteners with multiple types of fastener head configurations; and with improved results over symmetric spline configurations.

In the embodiment shown, wrench 300 also includes outer joining surfaces 334 and inner joining surfaces or inner circumferential joining surfaces 352 that respectively join each tightening surface 338 and loosening surface 336 of splines 332 and recesses 350. The respective splines and recesses are formed from a hard metal to generate as much torque before failure of wrench 300 as possible. Such hard metal may, for example, include steel, tempered steel, stainless steel, titanium, chromium or any alloy and/or combination thereof. Nickel chromium 43-40 steel has been found to be particularly good for the wrenches disclosed herein.

Figure 16A:
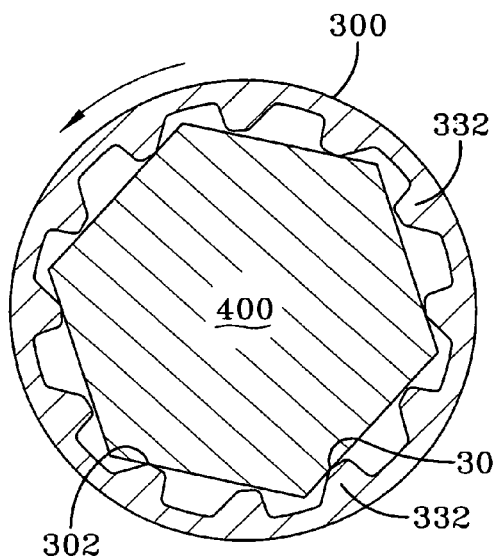
FIGS. 16A–16D illustrate top or socket end views of an asymmetrical spline wrench engaging multiple types of fasteners in a loosening direction.

Turning to FIGS. 16A–16D, asymmetrical spline wrench 300 is shown engaged with various fastener configurations for turning the respective fasteners in the loosening direction as shown by the respective arrows. FIG. 16A shows asymmetrical spline wrench 300 engaged with and turning symmetrical hex-headed fastener 400 in the loosening direction. The splines 332 of asymmetric wrench 300 engage the sides of fastener 400 at points of engagement 302 away from the fastener corners or points. The curved intersections of splines 332 significantly reduce the application of concentrated stress to fastener 400.

Figure 16B:
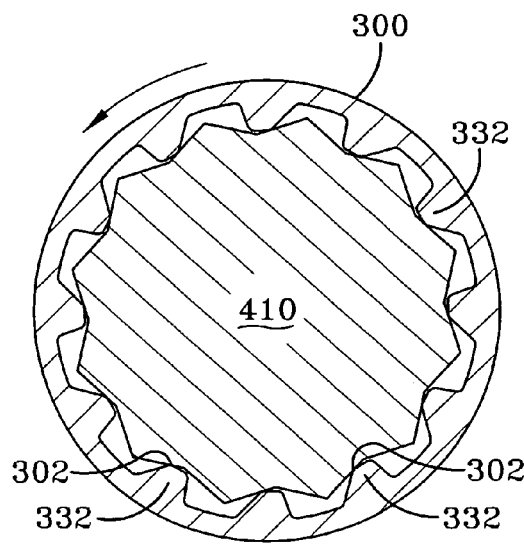

Referring to FIG. 16B, wrench 300 is illustrated engaged with and turning a standard double-hex (or 12-hex) headed fastener 410 in the loosening direction. Splines 332 of wrench 300 engage double-hex headed fastener 410 away from the fastener points, along fastener 410 edges at points of engagement 302. By engaging the fasteners along their sides, a greater torque in the loosening direction may be achieved before failure of the fastener than would be possible with the conventional symmetrical 12-spline wrench engaging and turning the same fastener. Furthermore, deformed corners, paint, rust and other fastener deficiencies do not deter wrench 300 from effectively loosening fasteners.

Figure 16C:
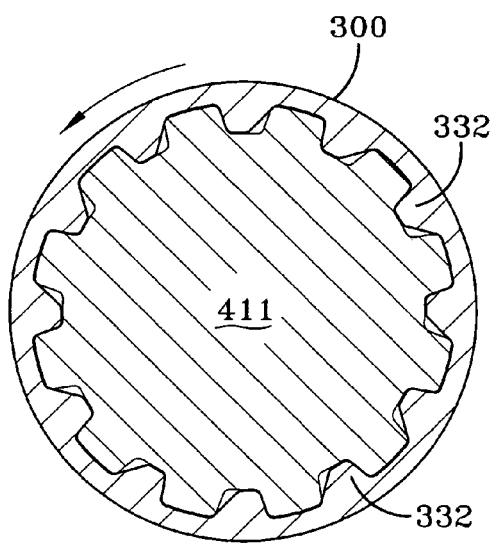
Figure 16D:
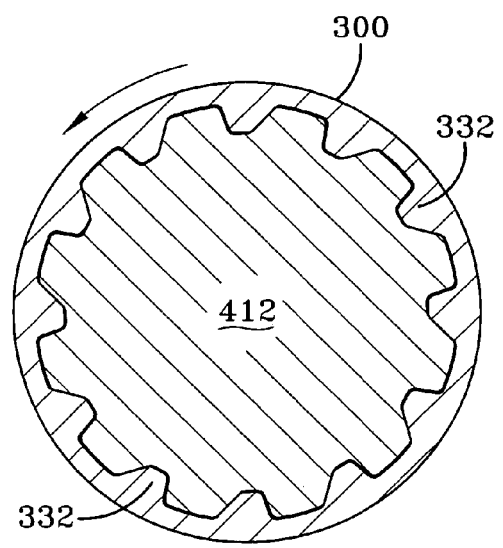
Figure 17A:
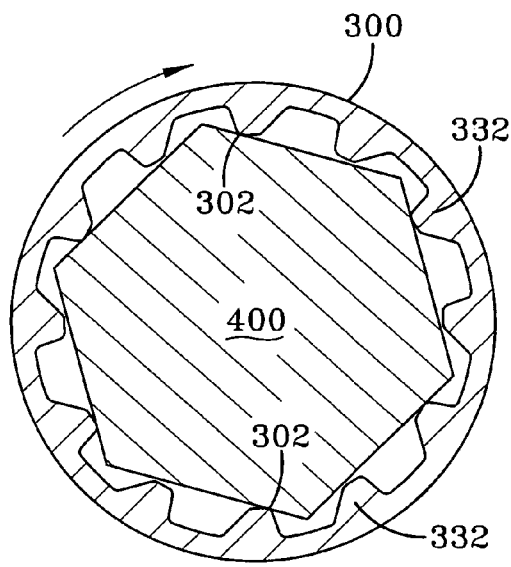
FIGS. 17A–17D illustrate top or socket end views of an asymmetrical spline wrench engaging multiple types of fasteners in a tightening direction.
Figure 17B:
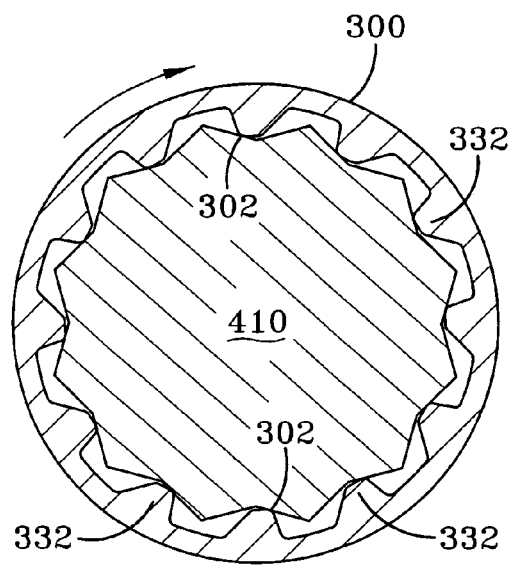
Figure 17C:
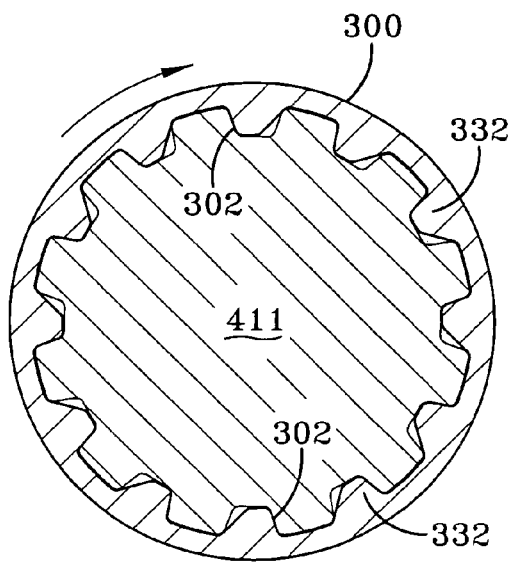
Figure 17D:
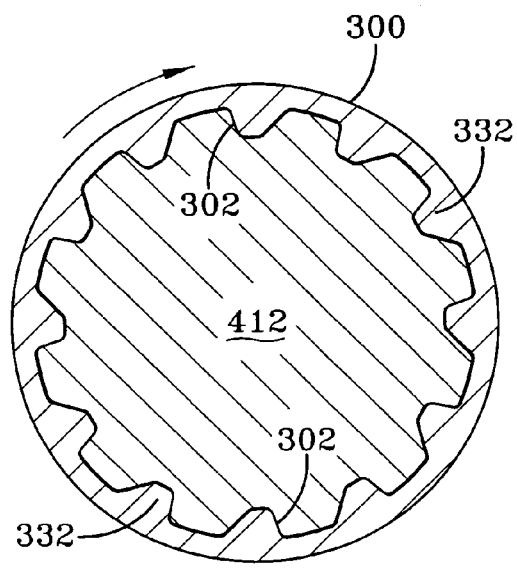

FIGS. 16C and 16D respectively illustrate, wrench 300 being engaged with and turning standard 12-spline symmetrical fastener 411 and a 12-spline asymmetrical spline fastener 412. Notably, wrench 300 engages symmetrical spline fastener 411 for turning in the loosening direction as well as, if not better than the standard symmetric 12-spline wrench. Furthermore, wrench 300 engages asymmetrical fastener 412 to facilitate a greater torque before failure of wrench 300 or fastener 412 in the loosening direction than in the tightening direction. Because of the asymmetrical configuration wrench 300 engages fasteners with more contact area further from the corners of the fastener than conventional wrenches with symmetric configurations. The asymmetric orientation facilitates increased torque transmission, a larger shear plane, and less damage to fastener rounded corners during engagement and turning of a fastener as compared with the conventional symmetric wrench configurations. In the examples shown, there is in each case a 0.006-inch clearance.

Turning to FIGS. 17A–17D, wrench 300 is illustrated engaging the same fasteners (e.g., hex 400, double-hex 410, symmetric spline 411 and asymmetric spline 412) and turning them in the tightening direction. As shown, wrench 300 engages the respective fasteners at engagement points 302 so that adequate tightening torque may be obtained. The corners of the fasteners are not engaged by splines 332 in tightening hex-fastener 400 or double hex-fastener 410, and thus avoids wear on the corners and damaging shear stress at or by the corners. Engagement of spline fastener 411 by the tightening sides and its rounded corners of wrench 300 greatly reduces any concentrated and possibly damaging stress. The wrenching action is particularly good with asymmetric fastener 412 since there is considerable engagement (as it was in the loosening direction) and little play between wrench 300 and fastener 412. There is great transmission of stress while significantly avoiding concentrated stress.

Figure 18A:
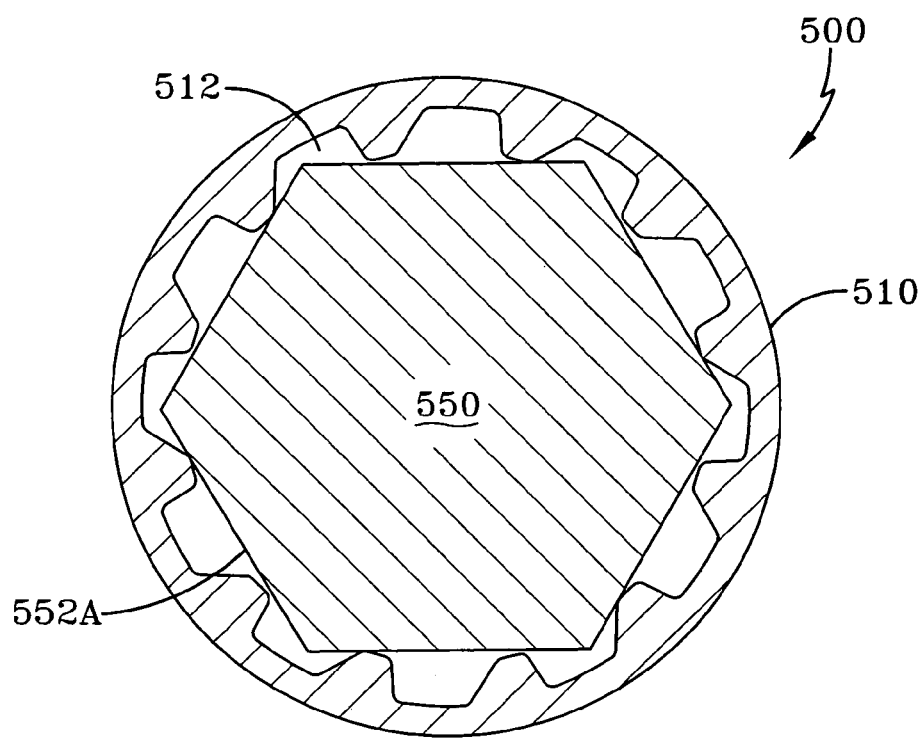
FIGS. 18A–18B illustrate a wrenching system with deformable fastener according to an embodiment of the invention.
Figure 18B:
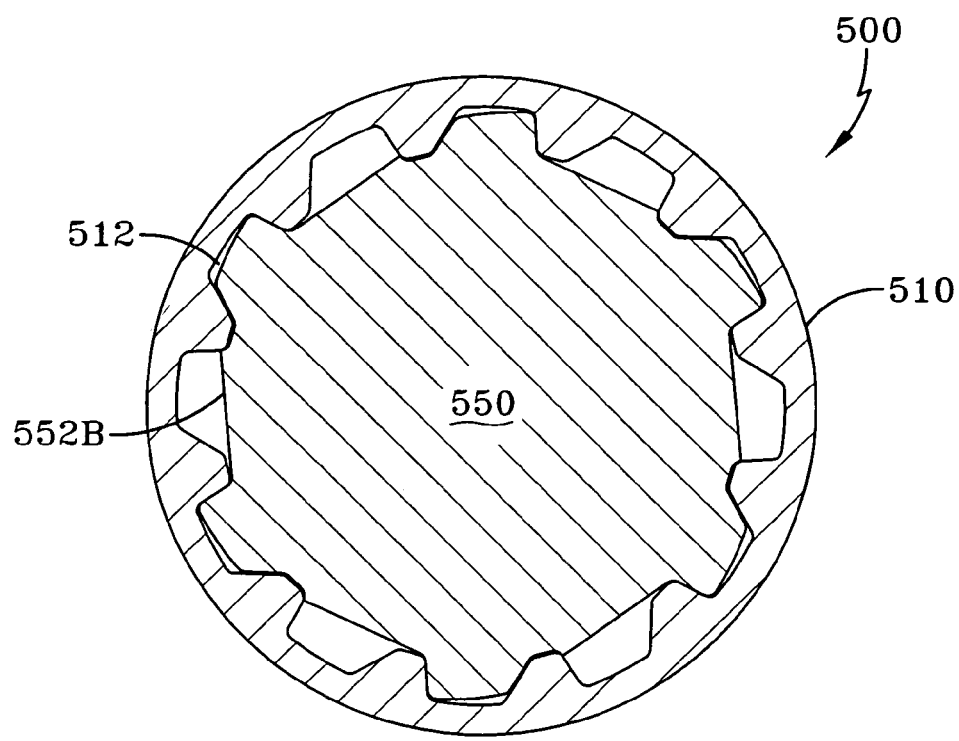

Referring to FIGS. 18A and 18B, another embodiment of the present invention will now be described. A wrenching system 500 according to this embodiment includes a fastener 550 having a first hardness and a wrench 510 having a second hardness greater than the first hardness. In this embodiment, fastener 550 includes a fastener head that is configured to at least partially deform when high turning torque is applied with wrench 510. FIG. 18A illustrates system 500 before such turning torque is applied and FIG. 15B illustrates system 500 during and/or after application of high turning torque.

Fastener 550 may be any type of threaded fastener, for example a nut, bolt, cap or screw having tightening/loosening surfaces (collectively or individually referred to as "fastening surfaces") with a first pre-torque shape 552A. Such fastening surfaces may have any configuration discussed herein including those with symmetric or non-symmetric shapes and/or internal or external fastening peripheries. As depicted in FIG. 18A, fastening/loosening surfaces have a pre-torque shape 552A of a hex fastener. The fastening surfaces are formed of a material having hardness malleable enough to deform into a second post-torque shape 552 when engaged by wrench 510 and turned with high torque.

Wrench 510 may be any type of wrench capable of engaging and turning fastener 550, e.g., the symmetric, asymmetric, external, internal configurations discussed herein. The only requirements for wrench 510 are: (i) that wrench 510 is made from a material with a hardness greater than that of deformable fastener 550; and (ii) that wrench 510, when engaged with fastener 550 having fastening surfaces with the first pre-torque shape 552A, include one or more spaces 512 for receiving the flowing metal of fastener 550 during its deformation. Wrench 510 is, or at least the corresponding tightening and/or loosening surfaces thereof are, formed of a material having a Shore hardness greater than the hardness of the fastener. This enables fastener 550 to deform into the second post-torque shape 552B while wrench 510 retains its original shape.

As depicted by the example embodiment in FIG. 18B, the fastening surfaces deform to fill in spaces 512 of wrench 510 (i.e., post-torque shape 552B) which promotes: (i) an increase in overall turning torque that may be applied to fastener 550 before complete failure of system 500; (ii) the prevention of substantial turning torque from being applied to fastener 550 in a direction of rotation opposite of that applied to render second post-torque shape 552B; and (iii) the prevention of fastener 550 from being turned in any direction of rotation once it has fully deformed.

Figure 19:
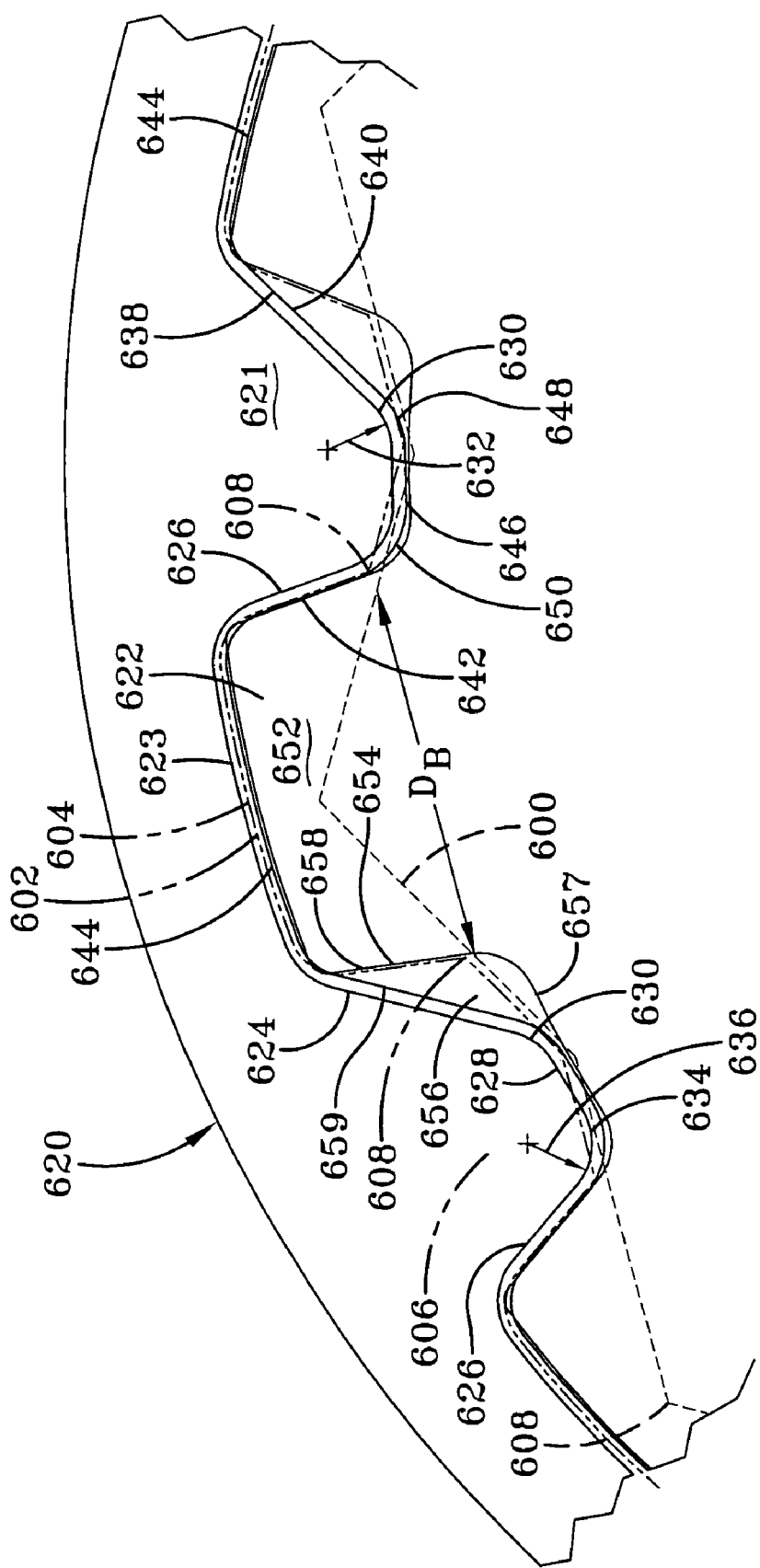
FIG. 19 is an enlarged view of a traditional spline wrench turning a double-hex fastener, and an asymmetrical spline wrench according to the invention turning an asymmetrical spline fastener.

FIG. 19 shows in detail the use of a prior art, traditional spline wrench and the wrench according to an aspect of the present invention for turning a traditional 12-point bolt head 600 shown in dotted lines. A traditional spline wrench 602 is shown in phantom lines. Wrench 602 has a surface 604 defining the outer portion of a recess 606 and splines 607 having points or corners 608 which can damage or be damaged by bolt head 600. An asymmetric spline wrench 620 is shown in solid lines. Asymmetric spline wrench 620 has splines 621 and recesses 622. Each recess 622 is defined by a surface 623 defining the outer portion of a recess, a tightening surface 624 and a loosening surface 626. Joining surfaces 628 extend between the tightening and loosening surfaces 624, 626 and are connected to tightening surface 624 by a curved section 630 defined by a radius 632. Likewise, joining surface 628 is connected to loosening surface 626 by a curved section 634 having a radius 636, radius 632 being larger than radius 636, since curved section 630 is larger than curved section 634. An asymmetric bolt head 638 according to the invention is also shown. Bolt head 638 is similar in configuration to wrench 620 and has a tightening surface 640, a loosening surface 642, an outer connecting surface 644 and an inner connecting surface 646. Curves 648 and 650 connect tightening surface 640 to outer connecting surface 644 and loosening surface 642, respectively. Curved surfaces connect the respective tightening surfaces and loosening surfaces to the outer connecting surfaces for both asymmetric wrench 620 and asymmetric bolt head 638, respectively.

The traditional 12-point spline both puts high intensity stress on bolt head 600 at its corners or points 608, which can weaken bolt head 600 and wrench 602, and round the corners. Moreover, the distance across the base of each of traditional splines 652 of a traditional 12-point bolt head is the distance $D_B$, which, when compared with an asymmetric spline 654, renders it susceptible to shear failure. Asymmetric splines each have a base tooth distance $D_A$, which is larger than $D_B$. Significantly, the asymmetric spline has an area 656 (bounded by lines 657, 658 (loosening surface of traditional spline 652) and 659) in addition to that of traditional spline 652, and this added material significantly strengthens spline 654 and renders it far less likely to shear failure than traditional spline 652.

Splines 621 of asymmetrical spline wrench 620 do not have sharp corners or "points" for engaging bolt head 600 or for being worn down by the bolt head. Rather, it (like other embodiments of the invention) has rounded corners defined, in this example, by radii 632 and 636, which do not exert the same type of concentrated stress on the fastener and cannot be worn down the way sharp corners of the prior art are worn down. This applies both to the traditional 12-point fastener and to asymmetrical spline fastener 638. The latter fastener forms a particularly good coupling with asymmetric wrench 620 because of the close engagement and lack of play between the fastener and wrench. The latter arrangement has extremely good wear and excellent durability due to the strengthened teeth which have broad base dimensions compared to traditional 12-point spline fasteners and wrenches.

Figure 20:
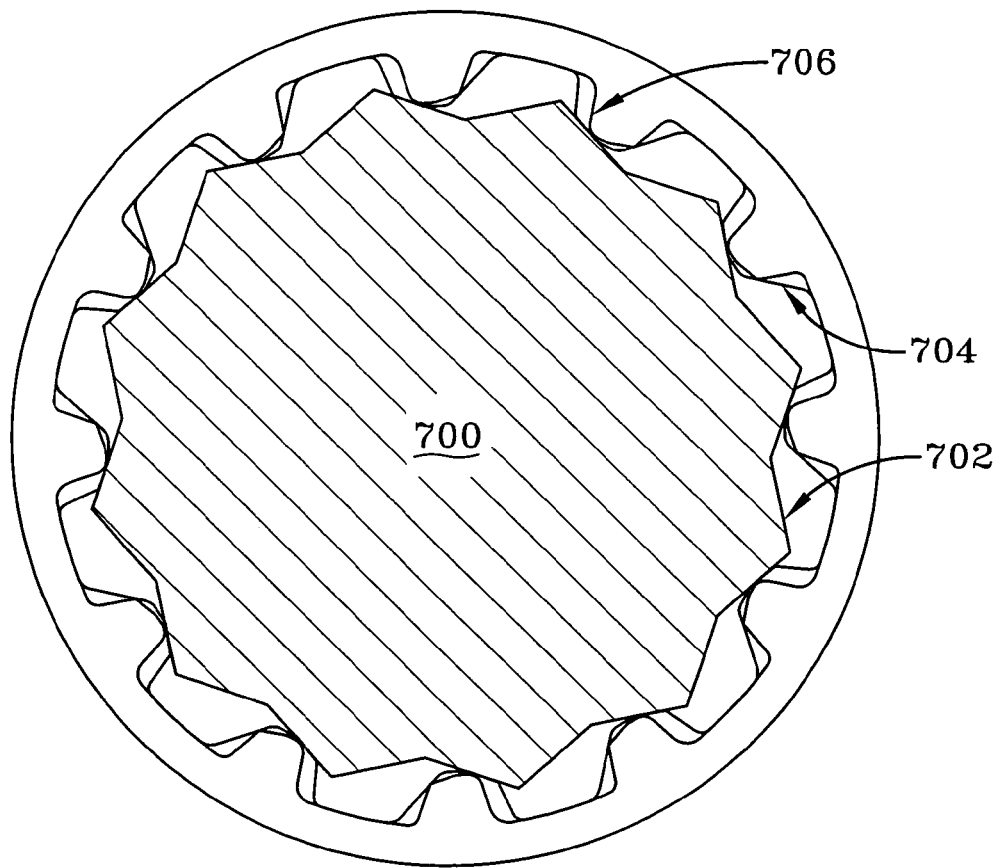
FIG. 20 is a top view of a double-hex socket wrench, a traditional spline wrench and an asymmetrical socket wrench according to the invention engaging a double-hex fastener.

FIG. 20 shows three types of sockets or wrenches for turning a double-hex fastener 700. A traditional double-hex socket 702, a traditional spline socket 704 and an asymmetric spline socket 706 according to the invention are all depicted. Even though each of these sockets can turn fastener 700, the enlarged view shown in FIG. 21 indicates the advantage of asymmetric spline socket 706.

Figure 21:
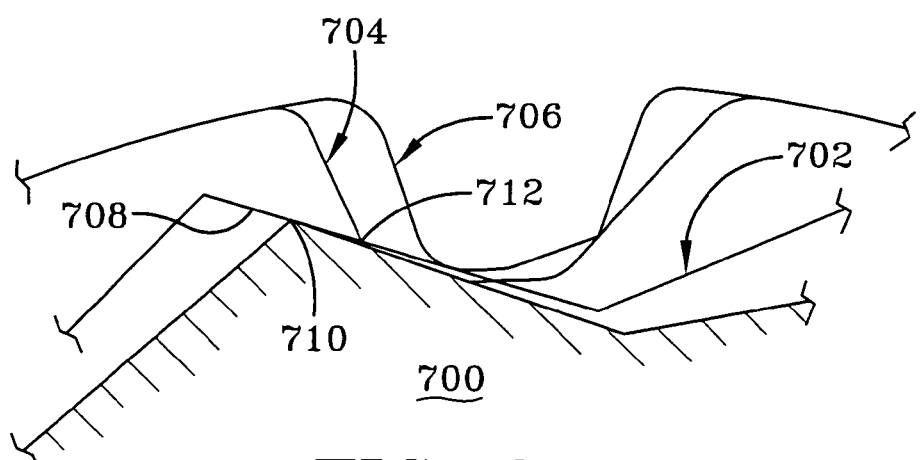
FIG. 21 is a detail of part of the view shown in FIG. 20.

FIG. 21 shows in greater detail the engagement of traditional double-hex or 12-point fastener 700 with traditional double-hex wrench or socket 702, traditional spline wrench or socket 704 and asymmetric spline wrench or socket 706. Considering first traditional double-hex socket 702, it is shown that its surface 708 engages point or corner 710 of fastener 700. Corner 710 applies a concentrated stress on surface 708, and either the force on surface 708 could lead to failure of socket 702 or could wear down with repeated use corner 710. Moreover, there is considerable play and little engagement between surface 708 and fastener 700. Traditional spline socket 704 has a point or corner 712 and can be worn down over extended use with fasteners. Moreover, corner 712 places a concentrated stress on fastener 700, and failure to the fastener or socket 704 is more likely to occur than with asymmetric spline socket 706. Also, as noted earlier, shear failure is more likely to occur with a traditional spline socket than with an asymmetric socket according to the invention.

The foregoing descriptions are specific embodiments of the present invention. These embodiments are described for the purposes of illustration only, and alterations and modifications may be practiced by those skilled in the art without departing from the spirit and scope of the invention. It is intended that all such modifications and alterations be included insofar as they come within the scope of the invention as claimed or the equivalents thereof.

I claim:

1. An asymmetric threaded open fastener for being turned by a wrench, said fastener having a fastener central axis and generally radially extending, outwardly directed fastener splines separated by alternating fastener recesses, each fastener spline comprising:
   a first surface on a first side of said fastener spline,
   a second surface on a side opposite from said first side of said fastener spline;
      said first surface having an inner end relatively close to said fastener central axis and an outer end, said first surface making a first interior angle with a radius intersecting said inner end;
      said second surface having an inner end relatively close to said fastener central axis and an outer end, said second surface making a second interior angle with a radius intersecting said inner end of said second surface, said second interior angle differing from said first interior angle; and
   inner joining surfaces interconnecting the inner ends of each of said first surfaces and the second surface of an adjacent spline, said inner joining surfaces being curved at said respective ends of said inner joining surfaces where they join the respective first and second surfaces, for engaging a corresponding wrench and applying a lower amount of concentrated stress to a cooperating wrench than would linear inner intersections having sharp corners.

2. An open fastener according to claim 1 wherein said fastener has a right-handed thread, and a first surface is a tightening surface and said second surface is a loosening surface.

3. An asymmetric threaded open fastener according to claim 1 wherein each of said inner intersections between each of said inner joining surfaces and the inner ends of each of said first surfaces is defined by a relatively large radius having an axis of rotation in said open fastener and each of said inner intersections between each of said inner joining surfaces and the inner ends of each of said second surfaces is defined by a relatively small radius having an axis of rotation in said open fastener.

4. An asymmetric threaded open fastener according to claim 1 wherein each of said outer intersections between each of said outer joining surfaces and the outer ends of each of said first surfaces is defined by a relatively large radius having an axis of rotation in said respective recess and each of said outer intersections between each of said outer joining surfaces and the outer ends of each of said second surfaces is defined by a relatively small radius having an axis of rotation in said respective recess.

5. An open fastener according to claim 1 wherein said fastener is a two-headed fastener, with one head being an upper head relative to the other, lower head, said upper head having said generally radially extending, outwardly directed fastener splines.

\* \* \* \* \*